(12) United States Patent
Chashiro

(10) Patent No.: US 8,622,485 B2
(45) Date of Patent: Jan. 7, 2014

(54) AUTOMOBILE WHEEL

(75) Inventor: Katsuya Chashiro, Aichi (JP)

(73) Assignee: Central Motor Wheel Co., Ltd., Aichi (JP)

( * ) Notice: Subject to any disclaimer, the term of this patent is extended or adjusted under 35 U.S.C. 154(b) by 587 days.

(21) Appl. No.: 12/970,287

(22) Filed: Dec. 16, 2010

(65) Prior Publication Data

US 2011/0156474 A1   Jun. 30, 2011

(30) Foreign Application Priority Data

Dec. 24, 2009 (JP) ................................. 2009-291653

(51) Int. Cl.
*B60B 3/04* (2006.01)

(52) U.S. Cl.
USPC ............. 301/63.105; 301/63.104; 301/63.106

(58) Field of Classification Search
USPC ............. 301/63.101, 63.103–63.107, 64.101; 29/894.322, 894.323
See application file for complete search history.

(56) References Cited

U.S. PATENT DOCUMENTS

| | | | | |
|---|---|---|---|---|
| 3,787,092 A | * | 1/1974 | Weegen et al. ........... | 301/63.105 |
| 5,188,429 A | * | 2/1993 | Heck et al. ............... | 301/64.307 |
| 5,257,455 A | * | 11/1993 | Iwatsuki ................... | 29/894.323 |
| 6,213,563 B1 | * | 4/2001 | Heck et al. ............... | 301/63.105 |
| 8,123,303 B2 | * | 2/2012 | Nakamura et al. ........ | 301/63.105 |
| 8,231,180 B2 | * | 7/2012 | Coleman et al. ......... | 301/63.104 |
| 8,403,426 B2 | * | 3/2013 | Fukaya ..................... | 301/63.105 |
| 2009/0212620 A1 | * | 8/2009 | Coleman et al. ......... | 301/63.104 |
| 2010/0181822 A1 | * | 7/2010 | Nakamura et al. ....... | 301/63.105 |
| 2011/0156474 A1 | * | 6/2011 | Chashiro .................. | 301/63.105 |
| 2011/0198915 A1 | * | 8/2011 | Chashiro .................. | 301/63.103 |
| 2011/0198916 A1 | * | 8/2011 | Chashiro .................. | 301/95.11 |
| 2013/0187440 A1 | * | 7/2013 | Coleman et al. ......... | 301/63.104 |

FOREIGN PATENT DOCUMENTS

JP              11-42901 A         2/1999

* cited by examiner

*Primary Examiner* — Glenn Dayoan
*Assistant Examiner* — Gregory Blankenship
(74) *Attorney, Agent, or Firm* — McDermott Will & Emery LLP

(57) ABSTRACT

An inner peripheral end portion of an annular back peripheral portion forming a front flange portion, an opening end portion of a front bead seat portion and a back surface portion of a wheel disc are joined to each other by a first welded portion and a second welded portion. Accordingly, it is possible to prevent the front flange portion from being repeatedly elastically deformed by loads generated while the automobile is running. In addition, it is possible to mitigate a stress concentration generated on the front flange portion and the first welded portion and the second welded portion. Thus, an automobile wheel can exhibit high durability.

7 Claims, 16 Drawing Sheets

FIG. 7
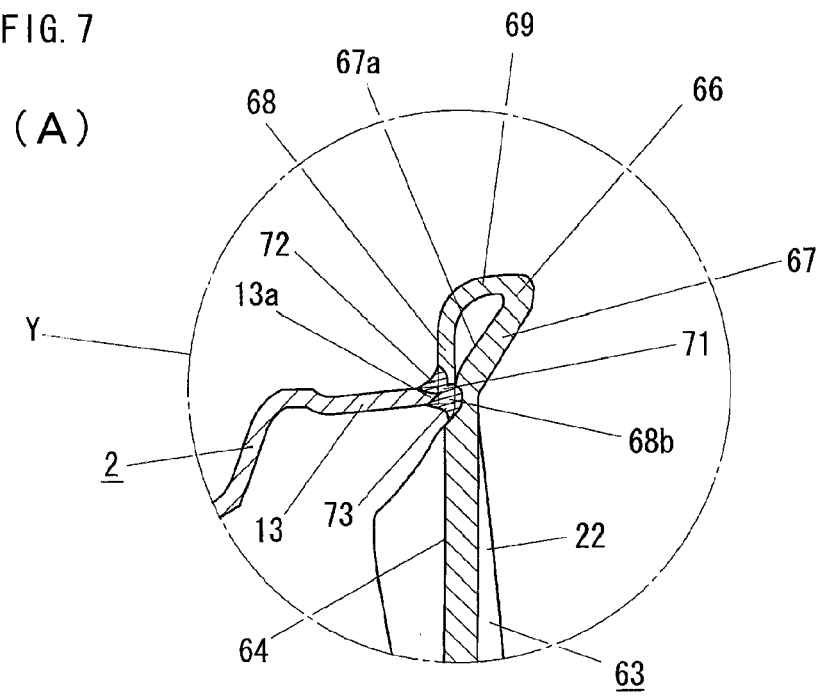
(A)
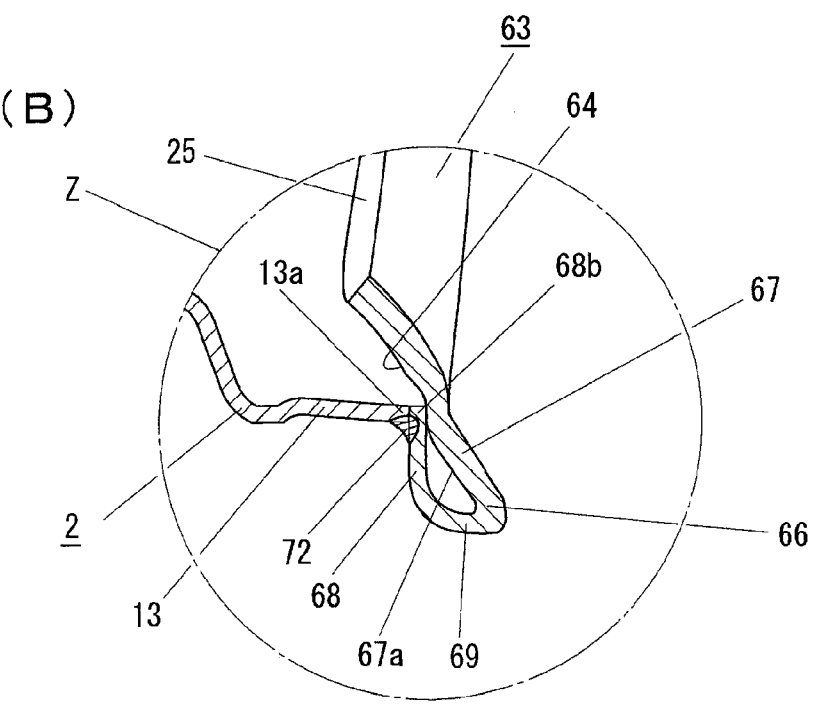
(B)

FIG. 8
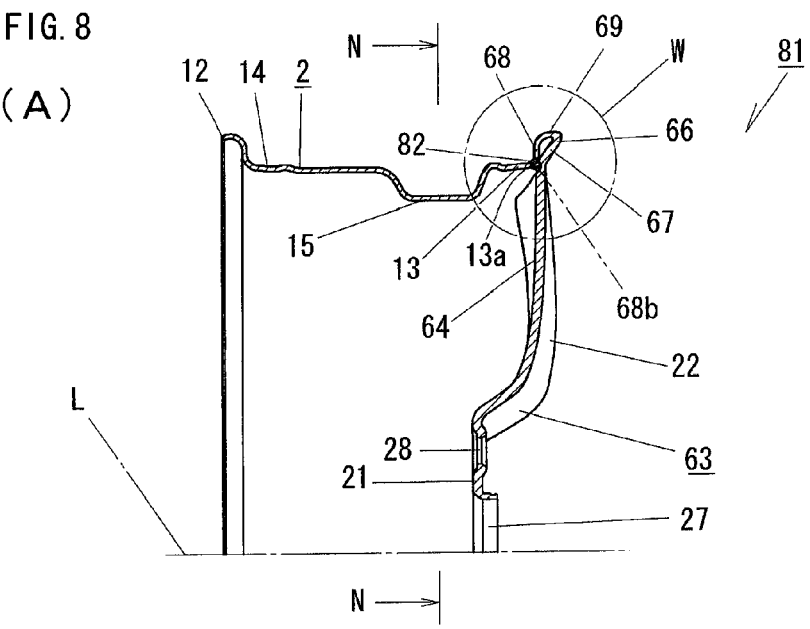
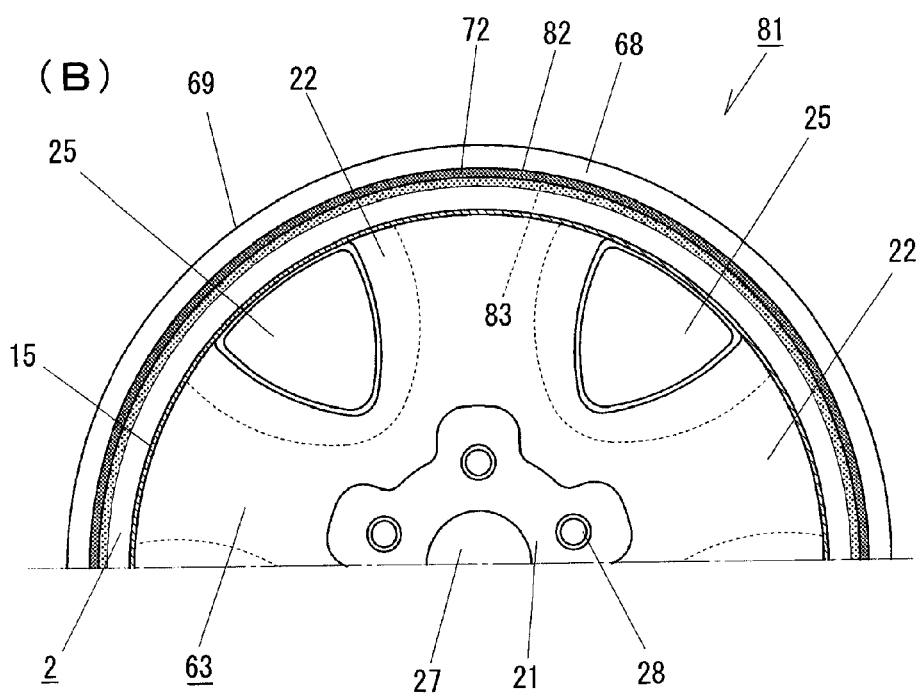

FIG. 13
(A)
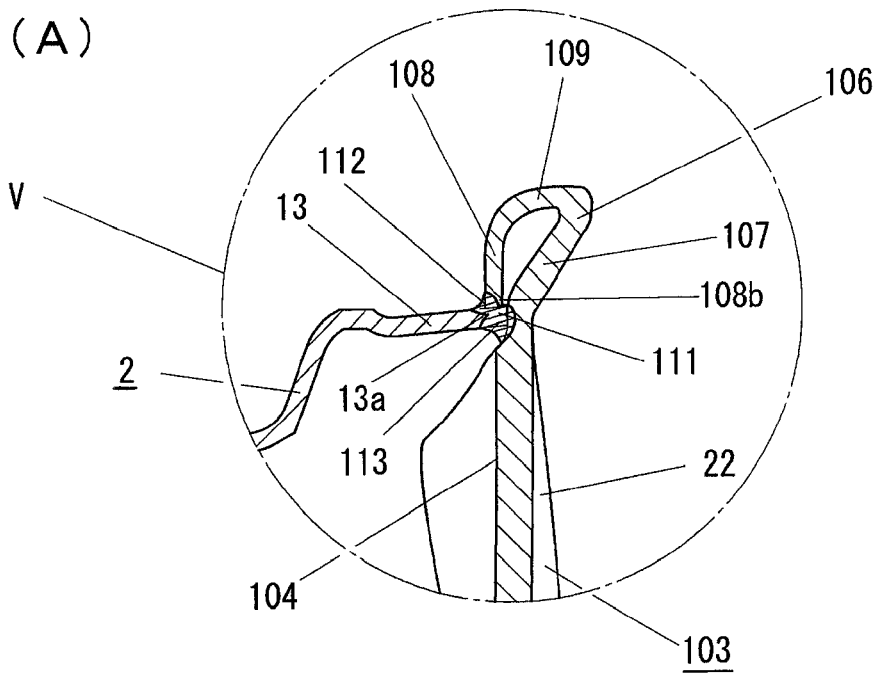
(B)
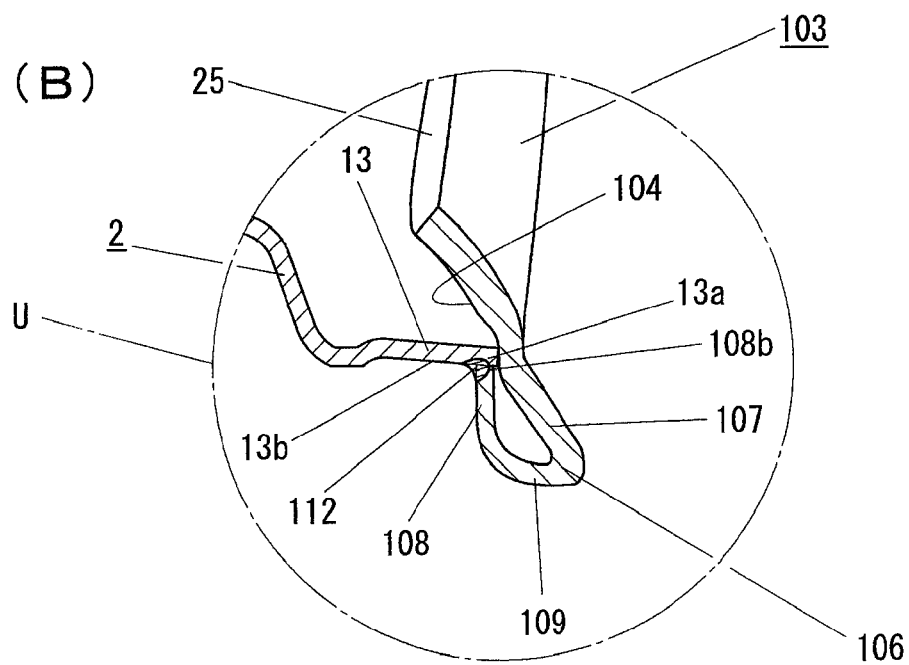

FIG. 14
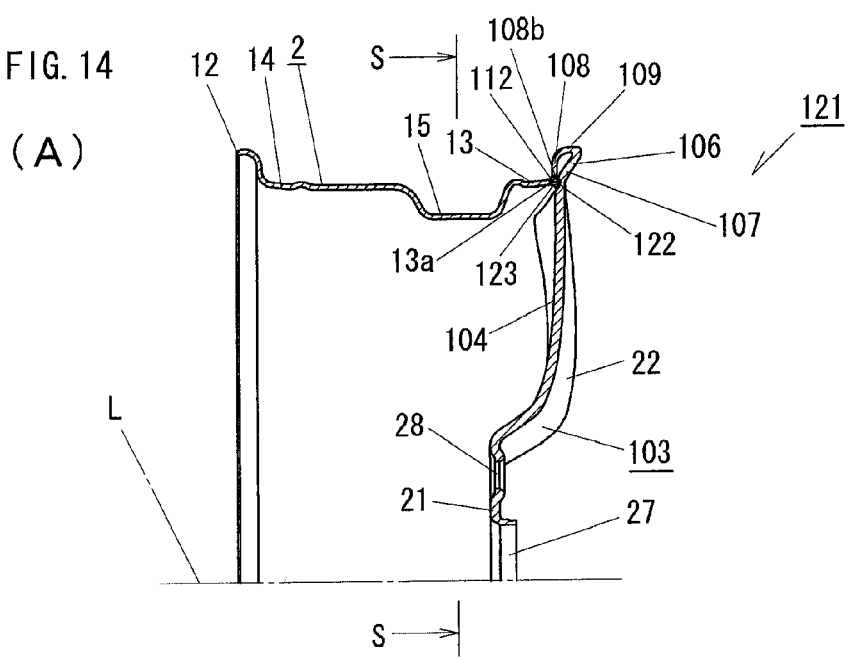
(A)
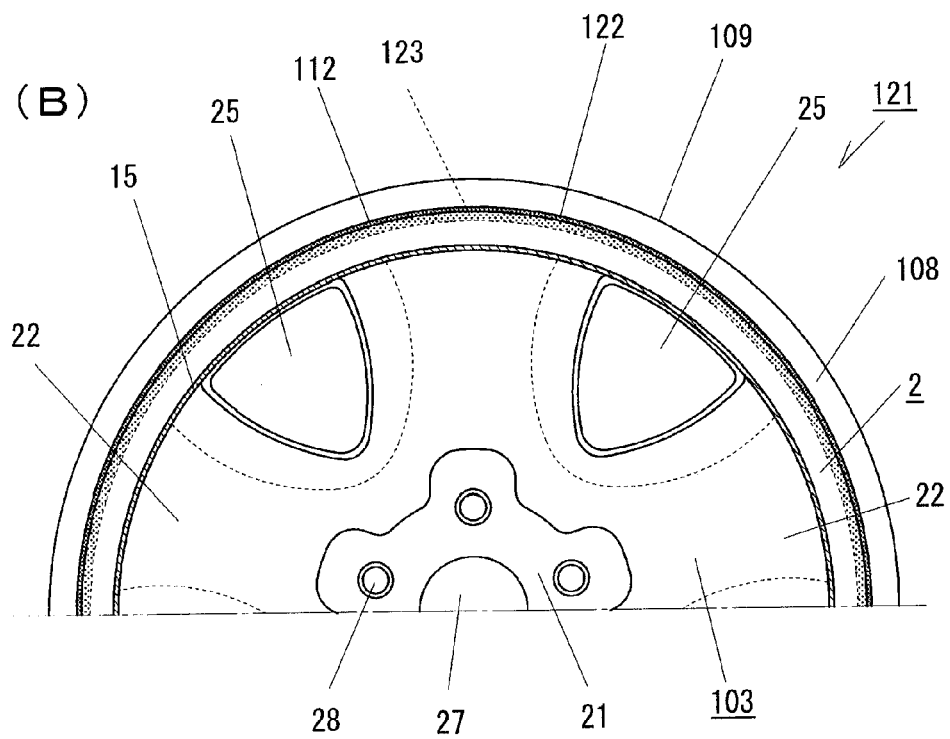
(B)

AUTOMOBILE WHEEL

CROSS-REFERENCE TO PRIOR APPLICATIONS

Priority is claimed to Japanese Patent Application No. 2009-291653, filed on Dec. 24, 2009, which is hereby incorporated by reference in its entirety herein.

FIELD OF THE INVENTION

The present invention relates to an automobile wheel in which a wheel rim on which a tire is to be mounted and a wheel disc to which an axle is to be coupled are welded to each other for integration.

BACKGROUND

There are so-called two-piece automobile wheels in which a generally cylindrical wheel rim and a generally disc-like wheel disc are welded to each other. As such two-piece automobile wheels, there are known full-face automobile wheels in which a front flange portion is formed at an outer peripheral edge portion of the wheel disc.

An example of the full-face automobile wheels is proposed in Japanese Unexamined Patent Publication No. JP-A-Hei 11-42901, for example. As shown in FIG. 16, a wheel rim "f" includes a front bead seat portion "g" provided at one opening edge portion and a back flange portion "j" provided at the other opening edge portion. A wheel disc "p" includes a front flange portion "r" provided at an outer peripheral edge portion and folded backward in a curved shape. An opening end portion "h" of the front bead seat portion "g" of the wheel rim "f" and an inner peripheral end portion "v" of the front flange portion "r" of the wheel disc "p" are welded to each other over the entire circumference of the wheel to form a full-face automobile wheel "m". The thus configured full-face automobile wheel "m" can secure a large design surface on the wheel disc "p", advantageously providing high design quality.

In the configuration disclosed in Japanese Unexamined Patent Publication No. JP-A-Hei 11-42901, the opening end portion "h" of the front bead seat portion "g" of the wheel rim "f" and the inner peripheral end portion "v" of the front flange portion "r" of the wheel disc "p" are welded to each other so that a welded portion "i" joins the wheel rim "f" and the wheel disc "p" to each other. When an automobile equipped with the automobile wheel "m" is running, a load acts on the wheel rim "f" via a tire, and a load acts on the wheel disc "p" via an axle. The front flange portion "r" of the automobile wheel "m" includes an annular front peripheral portion "s" provided on the design surface side, and an annular back peripheral portion "t" formed continuously from the annular front peripheral portion "s" and folded backward in a curved shape. A hollow area is formed between the annular front peripheral portion and the annular back peripheral portion "t" Due to the shape of the front flange portion "r" described above, the front flange portion "r" tends to be repeatedly elastically deformed by the load acting on the wheel rim "f" and the load acting on the wheel disc "p", and tends to be subjected to a stress concentration. Further, because the front flange portion "r" is folded backward through a pressing process or the like, a residual stress may be caused at a curved outer peripheral edge portion of the front flange portion "r". The durability of the front flange portion "r" is limited by the residual stress and the stress concentration due to the loads described above.

The welded portion "i" described above at which the opening end portion "h" of the front bead seat portion "g" and the inner peripheral end portion "v" of the front flange portion "r" are welded to each other also tends to be subjected to a stress concentration caused by the above loads acting while the vehicle is running. If the welded portion "i" should be cracked (broken), air in the tire may leak. Thus, it is desired to improve the durability of the welded portion "i".

The present invention proposes an automobile wheel that includes a wheel disc with a front flange portion folded backward and a wheel disc and that can exhibit high durability.

SUMMARY OF THE INVENTION

An aspect of the present invention provides an automobile wheel including a wheel rim in which a back flange portion is formed at one opening edge portion and a front bead seat portion is formed at the other opening edge portion, and a wheel disc in which a front flange portion is formed at an outer peripheral edge portion, in which the front flange portion of the wheel disc includes an annular front peripheral portion provided on a design surface side and an annular back peripheral portion folded backward from the annular front peripheral portion and formed continuously from the annular front peripheral portion to extend radially inward, the automobile wheel includes: a first welded portion in which an inner peripheral end portion of the annular back peripheral portion forming the front flange portion of the wheel disc and an opening end portion of the front bead seat portion of the wheel rim are welded to each other; and a second welded portion in which the opening end portion of the front bead seat portion of the wheel rim and a back surface portion of the wheel disc are welded to each other, and one of the first welded portion and the second welded portion is formed over the entire circumference of the wheel, and the other of the first welded portion and the second welded portion is formed over the entire circumference of the wheel or intermittently at a plurality of points along the circumference of the wheel.

A second aspect of the present invention provides an automobile wheel including a wheel rim in which a back flange portion is formed at one opening edge portion and a front bead seat portion is formed at the other opening edge portion, and a wheel disc in which a front flange portion is formed at an outer peripheral edge portion, in which the front flange portion of the wheel disc includes an annular front peripheral portion provided on a design surface side and an annular back peripheral portion folded backward from the annular front peripheral portion and formed continuously from the annular front peripheral portion to extend radially inward, the automobile wheel includes: a first welded portion in which an inner peripheral end portion of the annular back peripheral portion forming the front flange portion of the wheel disc and an opening end portion of the front bead seat portion of the wheel rim are welded to each other; and a second welded portion in which the inner peripheral end portion of the annular back peripheral portion of the front flange portion of the wheel disc and a back surface portion of the wheel disc are welded to each other, and the first welded portion is formed over the entire circumference of the wheel, and the second welded portion is formed over the entire circumference of the wheel or intermittently at a plurality of points along the circumference of the wheel.

The front flange portion supports a bead of a tire, which is mounted on the wheel, from a side. Therefore, with the annular back peripheral portion of the front flange portion formed at the outer peripheral edge portion of the wheel disc and the front bead seat portion of the wheel rim joined to each other through the first welded portion, it is possible to obtain strength and rigidity necessary and sufficient to support the bead of the tire from a side. According to the configuration of this example, in which at least one of the first welded portion and the second welded portion is formed over the entire circumference of the wheel, leakage of air in the tire can be prevented. In the configuration according to this aspect, preferably, the first welded portion is formed over the entire circumference of the wheel. This further improves the strength and rigidity of the front flange portion to support the bead of the tire from a side. According to the configuration of another aspect, in which the first welded portion is formed over the entire circumference of the wheel, leakage of air in the tire can be prevented.

In the configurations according to the above aspects, the opening end portion of the front bead seat portion of the wheel rim, the annular back peripheral portion of the front flange portion of the wheel disc, and the back surface portion of the wheel disc are directly or indirectly joined to each other by the first welded portion and the second welded portion. In the case of the first aspect, the inner peripheral end portion of the annular back peripheral portion of the front flange portion of the wheel disc and the opening end portion of the front bead seat portion of the wheel rim are directly joined to each other by the first welded portion. Further, the opening end portion of the front bead seat portion of the wheel rim and the back surface portion of the wheel disc are directly joined to each other by the second welded portion. That is, the inner peripheral end portion of the annular back peripheral portion of the front flange portion of the wheel disc and the back surface portion of the wheel disc are joined to each other via the first welded portion and the second welded portion. In the case of the second aspect, meanwhile, the inner peripheral end portion of the annular back peripheral portion of the front flange portion of the wheel disc and the opening end portion of the front bead seat portion of the wheel rim are directly joined to each other by the first welded portion. Further, the inner peripheral end portion of the annular back peripheral portion of the front flange portion of the wheel disc and the back surface portion of the wheel disc are directly joined to each other by the second welded portion. That is, the opening end portion of the front bead seat portion of the wheel rim and the back surface portion of the wheel disc are directly joined to each other via the first welded portion and the second welded portion. According to the configurations of the above aspects, it is possible to prevent the loads generated while the automobile is running discussed above from acting on the front flange portion of the wheel disc. Therefore, it is possible to prevent an outer peripheral edge portion (hereinafter referred to as a "folded peripheral edge portion") of the front flange portion of the wheel disc from being repeatedly elastically deformed, and to mitigate a stress concentration generated on the folded peripheral edge portion.

Further, with the wheel rim and the wheel disc joined to each other by the first welded portion and the second welded portion described above, the strength and rigidity of the joint between the wheel rim and the wheel disc can be improved compared to the configuration according to the related art discussed above. In addition, it is possible to mitigate a stress concentration generated on the first welded portion and the second welded portion by the loads generated while the automobile is running as discussed above.

According to the configurations of the above aspects, the folded peripheral edge portion of the front flange portion and the first welded portion and the second welded portion can have a sufficient stress allowance before their respective durability limits are reached since it is possible to mitigate a stress concentration generated on the folded peripheral edge portion and the first and second welded portions. Thus, the durability of the wheel against loads acting while the automobile is running is improved.

The first welded portion and the second welded portion may be formed by welding from the radially outer side of the wheel rim, or may be formed by welding from the radially inner side of the wheel rim. Further, one of the first welded portion and the second welded portion may be formed by welding from the radially outer side of the wheel rim, and the other of the first welded portion and the second welded portion may be formed by welding from the radially inner side of the wheel rim.

In the automobile wheel according to one of the aspects discussed above, the inner peripheral end portion of the annular back peripheral portion forming the front flange portion of the wheel disc, the opening end portion of the front bead seat portion of the wheel rim, and the back surface portion of the wheel disc may be integrally joined to each other by a continuous welded portion in which the first welded portion and the second welded portion are formed continuously with each other.

In such a configuration, the inner peripheral end portion of the annular back peripheral portion of the front flange portion of the wheel disc and the back surface portion of the wheel disc are directly joined to each other by the continuous welded portion, and the opening end portion of the front bead seat portion of the wheel rim and the back surface portion of the wheel disc are directly joined to each other by the continuous welded portion. Accordingly, it is possible to further prevent the folded peripheral edge portion of the front flange portion of the wheel disc from being repeatedly elastically deformed by loads generated while the automobile is running, and to further improve the effect of mitigating a stress concentration generated on the folded peripheral edge portion. Furthermore, it is possible to improve the strength and rigidity of the continuous welded portion, and to further improve the effect of mitigating a stress concentration generated on the continuous welded portion by loads generated while the automobile is running. Thus, the effect of the present invention discussed above to improve the durability of the wheel against loads generated while the automobile is running is further improved.

The continuous welded portion may be formed as a result of separately preparing the first welded portion and the second welded portion so as to be continuous with each other, or may be prepared such that the first welded portion and the second welded portion are formed continuously with each other.

In the case where one of the first welded portion and the second welded portion is formed intermittently at a plurality of points along the circumference of the wheel in the first aspect discussed above, and in the case where the second welded portion is formed intermittently at a plurality of points along the circumference of the wheel in the second aspect discussed above, the continuous welded portion may be formed intermittently at a plurality of points along the circumference of the wheel.

In the automobile wheel according to one of the aspects discussed above, an annular joint groove, in which the opening end portion of the front bead seat portion of the wheel rim is to be seated, may be formed circumferentially in the back surface portion of the wheel disc, and the annular joint groove, the opening end portion of the front bead seat portion seated in the annular joint groove, and the inner peripheral end portion of the front flange portion may be integrally joined to each other by the continuous welded portion in which the first welded portion and the second welded portion are formed continuously with each other.

The continuous welded portion is formed with the first welded portion and the second welded portion continuous with each other, and thus tends to be relatively large. In this configuration, a part of the continuous welded portion can be formed in the annular joint groove by seating the opening end portion of the front bead seat portion of the wheel rim in the annular joint groove formed in the back surface portion of the wheel disc and welding the opening end portion in the annular joint groove. Therefore, the continuous welded portion can be prevented from swelling out. Since the continuous welded portion is not swelled in the case where the continuous welded portion is formed from the outer side of the wheel rim, interference between a bead of a tire, which is mounted on the automobile wheel, and the continuous welded portion can be suppressed. Accordingly, the bead of the tire can be securely brought into tight contact with the front bead seat portion of the wheel rim and the front flange portion of the wheel disc.

In the automobile wheel according to one of the aspects discussed above, the front flange portion of the wheel disc may be formed such that a back surface of the annular front peripheral portion and a front surface of the annular back peripheral portion contact each other.

According to such a configuration, the integrity between the annular front peripheral portion and the annular back peripheral portion forming the front flange portion is improved. Therefore, it is possible to prevent the folded peripheral edge portion of the front flange portion from being repeatedly locally elastically deformed as much as possible. Accordingly, the effect of mitigating a stress concentration generated on the folded peripheral edge portion of the front flange portion of the wheel disc while the vehicle is running is further improved. Furthermore, the front flange portion can exhibit high strength and rigidity. Thus, the effect of the present invention discussed above to improve the durability of the wheel against loads acting while the automobile is running is further improved.

In the automobile wheel according to an example of the present invention, as discussed above, one of the first welded portion, in which the inner peripheral end portion of the annular back peripheral portion forming the front flange portion of the wheel disc and the opening end portion of the front bead seat portion of the wheel rim are welded to each other, and the second welded portion, in which the opening end portion of the front bead seat portion of the wheel rim and the back surface portion of the wheel disc are welded to each other, is formed over the entire circumference of the wheel, and the other of the first welded portion and the second welded portion is formed over the entire circumference of the wheel or intermittently at a plurality of points along the circumference of the wheel. Meanwhile, in the automobile wheel according to another example, as discussed above, the first welded portion in which the inner peripheral end portion of the annular back peripheral portion forming the front flange portion of the wheel disc and the opening end portion of the front bead seat portion of the wheel rim are welded to each other is formed over the entire circumference of the wheel, and the second welded portion in which the inner peripheral end portion of the annular back peripheral portion of the front flange portion of the wheel disc and the back surface portion of the wheel disc are welded to each other is formed over the entire circumference of the wheel or intermittently at a plurality of points along the circumference of the wheel. According to either of the automobile wheels, it is possible to mitigate a stress concentration generated on the folded peripheral edge portion of the front flange portion and the first welded portion and the second welded portion by loads generated while the automobile is running, generally improving the durability of the wheel against the loads generated while the automobile is running. Thus, the automobile wheel according to the present invention exhibits high durability.

In the automobile wheel discussed above, the inner peripheral end portion of the annular back peripheral portion of the front flange portion of the wheel disc, the opening end portion of the front bead seat portion of the wheel rim, and the back surface portion of the wheel disc may be integrally joined to each other by the continuous welded portion in which the first welded portion and the second welded portion are formed continuously with each other. In such a case, the inner peripheral end portion of the annular back peripheral portion of the front flange portion and the opening end portion of the front bead seat portion are directly joined to the back surface portion of the wheel disc, and thus the effect of mitigating a stress concentration generated on the folded peripheral edge portion of the front flange portion is further improved. Further, the continuous welded portion exhibits high strength and rigidity, and the effect of mitigating a stress concentration generated on the continuous welded portion is further improved. Thus, the effect of the present invention discussed above to improve the durability of the wheel against loads generated while the automobile is running is further improved.

In the automobile wheel discussed above, the opening end portion of the front bead seat portion of the wheel rim may be seated in the annular joint groove formed, circumferentially in the back surface portion of the wheel disc, and welded in the annular joint groove by the continuous welded portion. In such a case, a part of the continuous welded portion can be formed in the annular joint groove, and thus the continuous welded portion can be prevented from swelling out. Therefore, a bead of a tire, which is mounted on the automobile wheel, can be securely brought into tight contact with the front bead seat portion and the front flange portion preventing occurrence of a failure such as leakage of air.

In the automobile wheel discussed above, the front flange portion of the wheel disc may be formed such that the back surface of the annular front peripheral portion and the front surface of the annular back peripheral portion contact each other. In such a case, the strength and rigidity of the front flange portion can be improved, and it is possible to prevent the folded peripheral edge portion of the front flange portion from being repeatedly locally elastically deformed as much as possible. Thus, the effect is to improve the durability of the wheel against loads generated while the automobile is running.

BRIEF DESCRIPTION OF THE DRAWINGS

FIG. 7A is an enlarged view of the part Y of FIG. 5, and FIG. 7B is an enlarged view of the part Z of FIG. 5.

FIG. 8A is a vertical cross-sectional view of an automobile wheel 81 according to an example, and FIG. 8B is a cross-sectional view taken along the line N-N of FIG. 8A.

FIG. 13A is an enlarged view of the part V of FIG. 11, and FIG. 13B is an enlarged view of the part U of FIG. 11.

FIG. 14A is a vertical cross-sectional view of an automobile wheel 121 according to yet another example, and FIG. 14B is a cross-sectional view taken along the line S-S of FIG. 14A.

DETAILED DESCRIPTION

An automobile wheel 1 according to an example of the present invention is described in detail with reference to the accompanying drawings.

Figure 1:
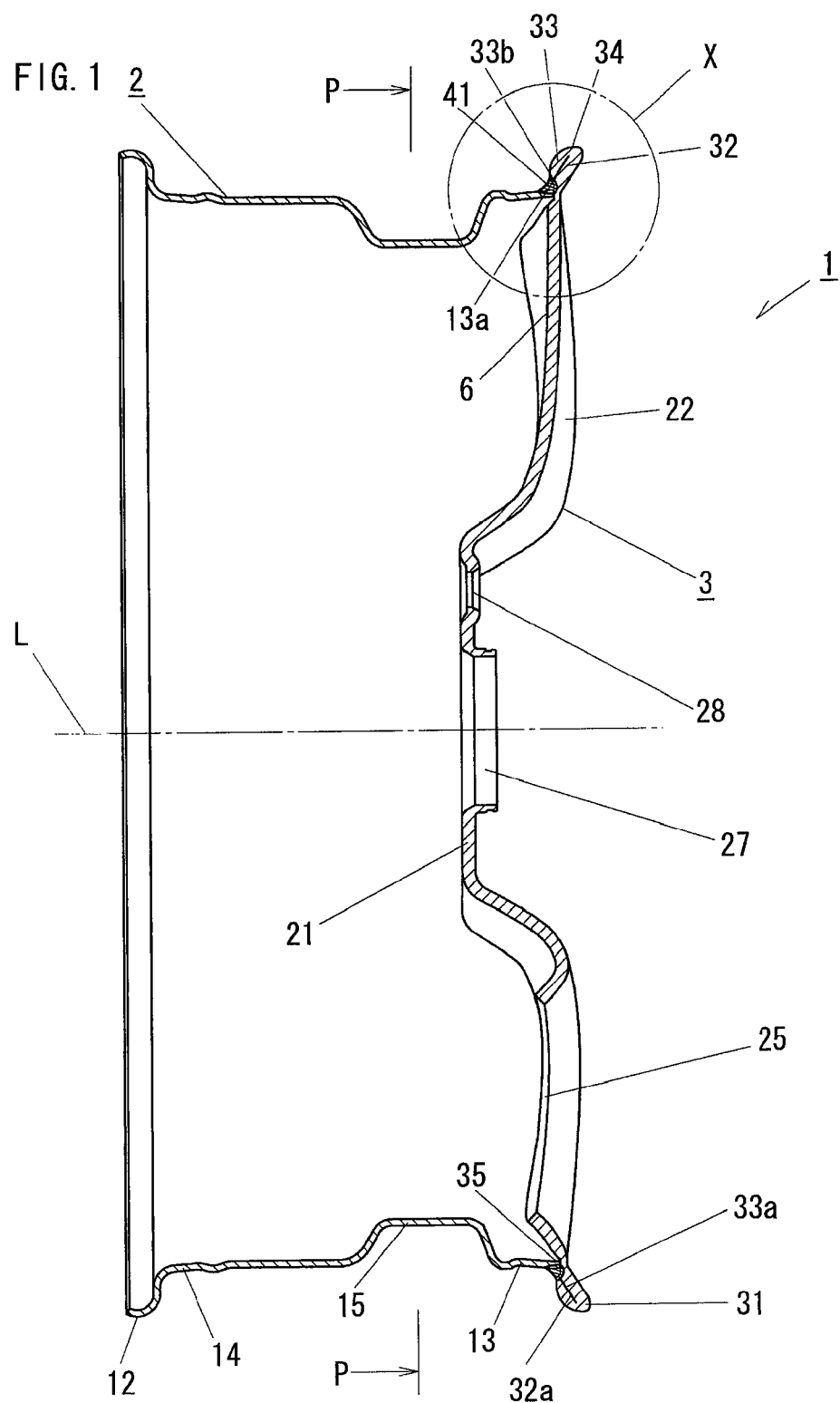
FIG. 1 is a vertical cross-sectional view of an automobile wheel 1 according to an example of the present invention.

FIG. 1 is a vertical cross-sectional view of the automobile wheel 1 according to an example. The automobile wheel 1 is a so-called two-piece steel wheel formed by joining a wheel rim 2 and a wheel disc 3 each formed from a flat steel plate to each other. The automobile wheel 1 has a full-face configuration in which a front flange portion 31 is provided at an outer peripheral edge portion of the wheel disc 3. In this example, the direction from the back surface side of the wheel disc 3 toward the design surface side is defined to as a "forward direction", and the opposite direction is defined to as a "backward direction". Also, the direction toward the center axis L of the automobile wheel 1 along the radial direction of the wheel is defined to as a "radially inward direction", and the opposite direction is defined to as a "radially outward direction".

The wheel rim 2 mentioned above is generally in the shape of a cylinder, and includes a back flange portion 12 provided at one (a rear) opening edge portion to support a back bead of a tire, and a back bead seat portion 14 which is formed continuously with the back flange portion 12 and on which the back bead of the tire is to be seated for support and fixation. The wheel rim 2 further includes a front bead seat portion 13 which is provided at the other (a front) opening edge portion and on which a front bead of the tire is to be seated for support and fixation. That is, no front flange portion 31 is formed at the other (front) opening edge portion of the wheel rim 2, and a front opening edge portion of the wheel rim 2 is formed by the annular front bead seat portion 13 extending along the front-back direction. The wheel rim 2 additionally includes a well portion 15 which is provided between the front and back bead seat portions 13 and 14 and into which the front and back beads of the tire are to be dropped to mount the tire.

The thus configured wheel rim 2 may be formed by abutting the short sides of a generally rectangular flat steel plate against each other and welding the short sides to each other to form a cylindrical member with a straight body, and then performing a so-called rolling process in which the cylindrical member is pressed by predetermined dies from both the inner and outer sides of the cylindrical member while it is rotated in the circumferential direction. The formation of the wheel rim 2 may be performed using a conventional formation method, and therefore is not described in detail herein.

Meanwhile, the wheel disc 3 mentioned above is generally in the shape of a disc, and includes a hub mounting portion 21 provided at the center to be coupled to a hub of an axle, and a front flange portion 31 provided circumferentially at an outer peripheral edge portion. The wheel disc 3 additionally includes a plurality of spoke portions 22 provided between and formed continuously with the hub mounting portion 21 and the front flange portion 31 and arranged, at equal intervals in the circumferential direction to extend radially. Further, ornamental holes 25 are respectively formed between adjacent ones of the spoke portions 22.

A hub hole 27 is formed in the center of the hub mounting portion 21. A plurality of bolt holes 28 are formed radially outwardly of the hub hole 27 and arranged at equal intervals in the circumferential direction. The components of the wheel disc 3 are arranged concentrically around the center axis L of the wheel disc 3. The spoke portions 22 are formed to swell forward from the peripheral edge of the hub mounting portion 21. The front flange portion 31 is formed to be smoothly continuous from the outer end of each of the spoke portions 22.

The front flange portion 31 is folded backward to extend radially inward, and includes an annular front peripheral portion 32 provided on the design surface side and formed continuously from an outer end of each of the spoke portions 22, and an annular back peripheral portion 33 formed continuously from the annular front peripheral portion 32 to extend backward and inward. A folded peripheral edge portion 34 provided at the boundary between the annular front peripheral portion 32 and the annular back peripheral portion 33 in the front flange portion 31 forms the outermost peripheral edge of the wheel disc 3. The front flange portion 31 is discussed in detail later.

The thus configured wheel disc 3 may be formed by performing a pressing process on a generally circular flat steel plate. The formation of the wheel disc 3 may be performed using a conventional formation method, and therefore is not described in detail herein.

The automobile wheel 1 according to an example is formed by welding the wheel rim 2 and the wheel disc 3 discussed above to each other. The formation of the automobile wheel 1 is discussed later.

Figure 2:
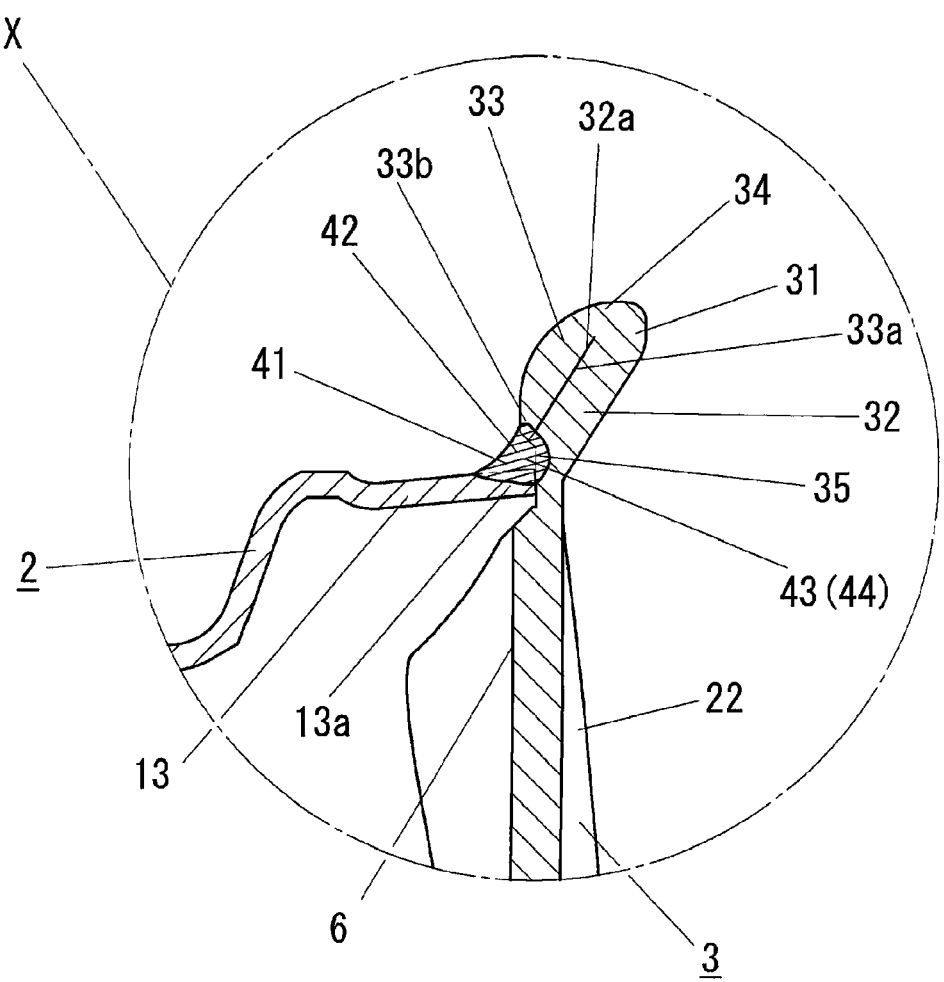
FIG. 2 is an enlarged view of the part X of FIG. 1.
Figure 16:
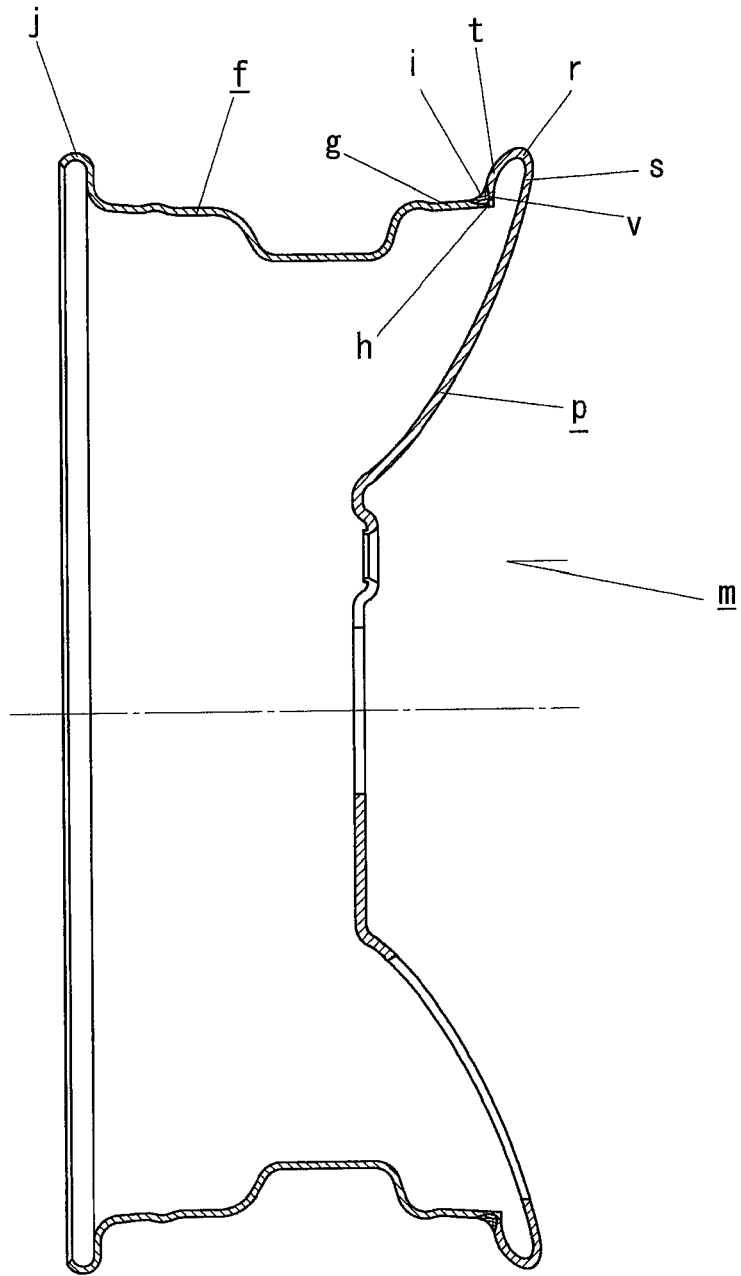
FIG. 16 is a vertical cross-sectional view of an automobile wheel "m" according to the related art.

As shown in FIGS. 1 and 2, the front flange portion 31 of the wheel disc 3 described above is formed with a back surface 32a of the annular front peripheral portion 32 and a front surface 33a of the annular back peripheral portion 33 entirely contact each other. That is, the back surface 32a of the annular front peripheral portion 32 and the front surface 33a of the annular back peripheral portion 33 are in surface contact with each other, and the front flange portion 31 is formed as if both the rear and front surfaces 32a and 33a were integral with each other. Therefore, unlike the configuration according to the related art discussed above (see FIG. 16), no space is provided between the annular front peripheral portion 32 and the annular back peripheral portion 33.

In the first example, the inside diameter of the annular back peripheral portion 33 of the front flange portion 31 is set to be slightly larger than the outside diameter of an opening end portion 13a of the front bead seat portion 13 of the wheel rim 2 described above. Accordingly, as discussed later, an inner peripheral end portion 33b of the annular back peripheral portion 33 of the front flange portion 31 is positioned radially outwardly of the opening end portion 13a of the front bead seat portion 13 of the wheel rim 2 with the opening end portion 13a of the front bead seat portion 13 abutted against a back surface portion 6 of the wheel disc 3.

Further, an annular joint groove 35 dented forward is formed circumferentially around the center axis L in the back surface portion 6 of the wheel disc 3. The annular joint groove 35 is formed adjacently on the inner side of the inner peripheral end portion 33b of the annular back peripheral portion 33 of the front flange portion 31 so that the opening end portion 13a of the front bead seat portion 13 of the wheel rim 2 is to be seated in the annular joint groove 35.

Figure 3:
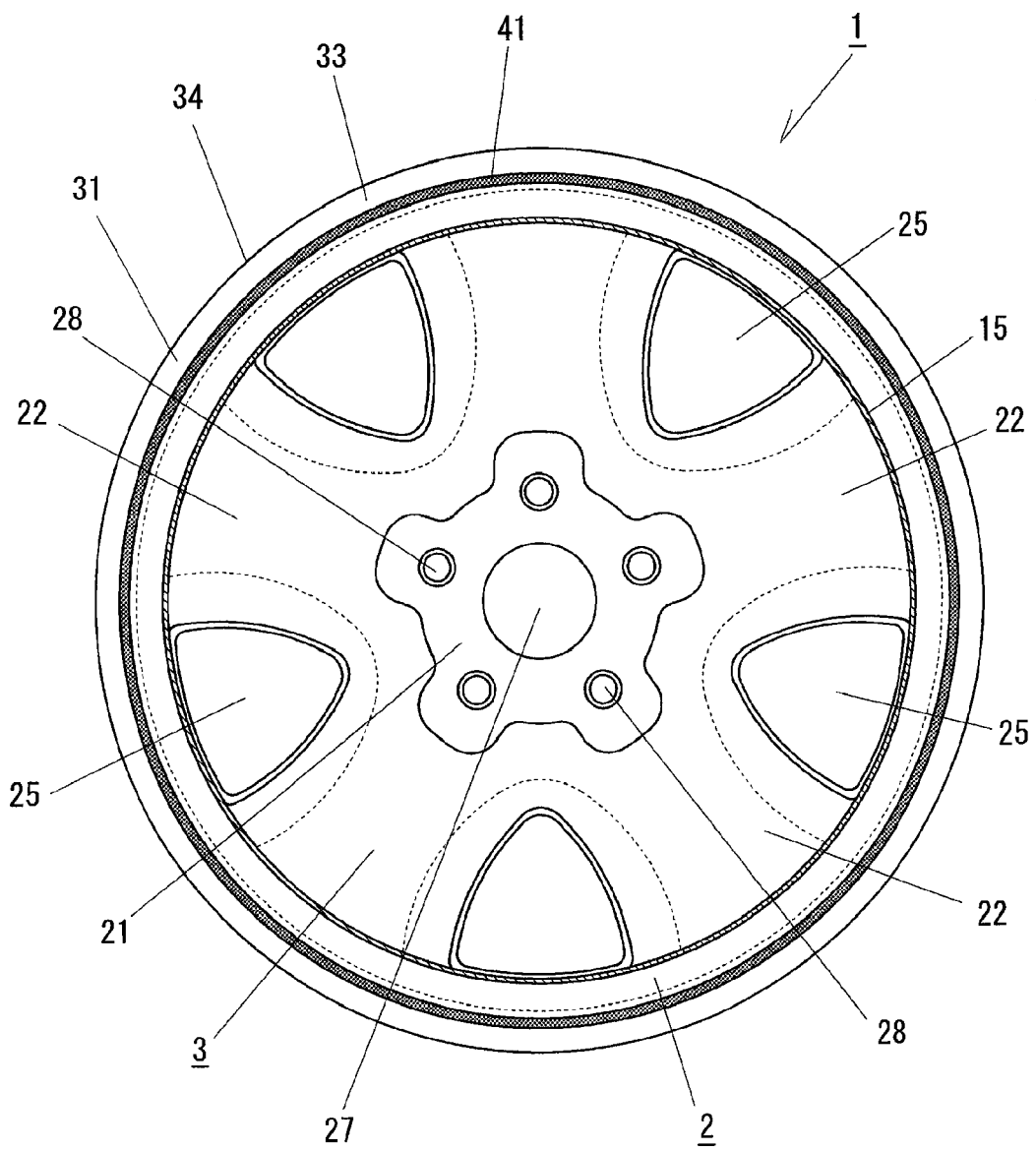
FIG. 3 is a cross-sectional view taken along the line P-P of FIG. 1.

The wheel disc 3 and the wheel rim 2 are joined to each other by positioning the opening end portion 13a of the front bead seat portion 13 of the wheel rim 2 in the annular joint groove 35 formed in the back surface portion 6 of the wheel disc 3 with the respective center axes L of the wheel disc 3 and the wheel rim 2 aligned with each other, and then welding the wheel disc 3 and the wheel rim 2 to each other. In the welding, the back surface portion 6 of the wheel disc 3, the inner peripheral end portion 33b of the annular back peripheral portion 33 of the front flange portion 31 of the wheel disc 3, and the opening end portion 13a of the front bead seat portion 13 of the wheel rim 2 are arc-welded to each other over the entire circumference of the wheel to be integrally joined to each other from the outer side of the wheel rim 2. As a result of the welding, as shown in FIG. 3, a single continuous welded portion 41 in which the wheel rim 2 and the wheel disc 3 are joined to each other is formed over the entire circumference of the wheel.

As shown in FIG. 2, the single continuous welded portion 41 is formed by performing three-point welding on the back surface portion 6 of the wheel disc 3, the inner peripheral end portion 33b of the annular back peripheral portion 33 of the front flange portion 31 of the wheel disc 3, and the opening end portion 13a of the front bead seat portion 13 of the wheel rim 2. That is, the continuous welded portion 41 includes a first welded portion 42, according to the present invention (the first aspect and the second aspect), in which the inner peripheral end portion 33b of the annular back peripheral portion 33 of the front flange portion 31 of the wheel disc 3 and the opening end portion 13a of the front bead seat portion 13 of the wheel rim 2 are welded to each other. The continuous welded portion 41 also includes a second welded portion 43, according to the first aspect, in which the opening end portion 13a of the front bead seat portion 13 of the wheel rim 2 and the back surface portion 6 of the wheel disc 3 are welded to each other. Alternatively, the continuous welded portion 41 includes a second welded portion 44, according to the second aspect, in which the inner peripheral end portion 33b of the annular back peripheral portion 33 of the front flange portion 31 of the wheel disc 3 and the back surface portion 6 of the wheel disc 3 are welded to each other. Thus, it can be said that the continuous welded portion 41 is integrally formed with the first welded portion 42 and the second welded portion 43 (or the second welded portion 44) formed continuously with each other.

In this example, further, the continuous welded portion 41 is formed to fill the annular joint groove 35 formed in the back surface portion 6 of the wheel disc 3. Therefore, the continuous welded portion 41 is prevented from swelling out from the wheel rim 2.

In the automobile wheel 1 as discussed above, the wheel rim 2 and the wheel disc 3 are joined to each other by the single continuous welded portion 41, at which the annular back peripheral portion 33 of the front flange portion 31 of the wheel disc 3, the back surface portion 6 of the wheel disc 3, and the front bead seat portion 13 of the wheel rim 2 are joined to each other. The front flange portion 31 is formed be integral with the inner peripheral end portion 33b of the annular back peripheral portion 33 and the back surface portion 6 of the wheel disc 3 joined to each other by the continuous welded portion 41 and with the annular back peripheral portion 33 and the annular front peripheral portion 32 contacting each other in the front-back direction. Further, the front bead seat portion 13 of the wheel rim 2 and the back surface portion 6 of the wheel disc 3 are joined to each other by the continuous welded portion 41. Thus, it is possible to prevent the load imposed on the wheel disc 3 via the axle and the load imposed on the wheel rim 2 via the tire while the vehicle is running from acting on the folded peripheral edge portion 34 of the front flange portion 31 as much as possible. Accordingly, it is possible to prevent the folded peripheral edge portion 34 of the front flange portion 31 from being repeatedly elastically deformed, and to mitigate a stress concentration generated on the front flange portion 31. Therefore, the folded peripheral edge portion 34 of the front flange portion 31 can have a sufficient stress allowance before a fatigue breakage occurs even in the case where a residual stress generated in the folded peripheral edge portion 34 of the front flange portion 31 during formation is left in the folded peripheral edge portion 34, improving the durability of the front flange portion 31.

Further, the single continuous welded portion 41 is formed by three-point welding. Thus, it is possible for the continuous welded portion 41 to exhibit high strength and rigidity, and to mitigate a stress concentration on the continuous welded portion 41 due to the loads generated while the automobile is running described above. Therefore, the durability of the continuous welded portion 41 can be improved. In the configuration according to the first embodiment, in particular, the single continuous welded portion 41 is formed over the entire circumference of the wheel. Thus, the durability of the continuous welded portion 41 and the front flange portion 31 can be further improved.

The thus configured automobile wheel 1 according to this example can exhibit high durability compared to the automobile wheel "m" according to the related art discussed above (see FIG. 16). In the automobile wheel "m" according to the related art, the front flange portion "r" is folded into a curved shape, and the front flange portion "r" and the front bead seat portion "g" of the wheel rim "f" are welded to each other. Thus, the front flange portion "r" and the welded portion "i" tend to be subjected to a stress concentration due to loads generated while the automobile is running. According to the automobile wheel 1 of this example, in contrast, it is possible to mitigate a stress concentration generated on the front flange portion 31 and the continuous welded portion 41, improving the durability of the automobile wheel 1 compared to the automobile wheel "m" according to the related art.

In the automobile wheel 1, the annular joint groove 35 is formed in the back surface portion 6 of the wheel disc 3, and the opening end portion 13a of the front bead seat portion 13 of the wheel rim 2 is seated in the annular joint groove 35 to be welded in the annular joint groove 35. The continuous welded portion 41 is partly formed in the annular joint groove 35. Accordingly, the continuous welded portion 41 can be prevented from swelling out from the wheel rim 2. According to the configuration, interference between a bead of a tire, which is mounted on the automobile wheel 1, and the continuous welded portion 41 can be suppressed. Thus, the bead of the tire and the front bead seat portion 13 of the wheel rim 2 and the front flange portion 31 of the wheel disc 3 can be securely brought into tight contact with each other.

Figure 4:
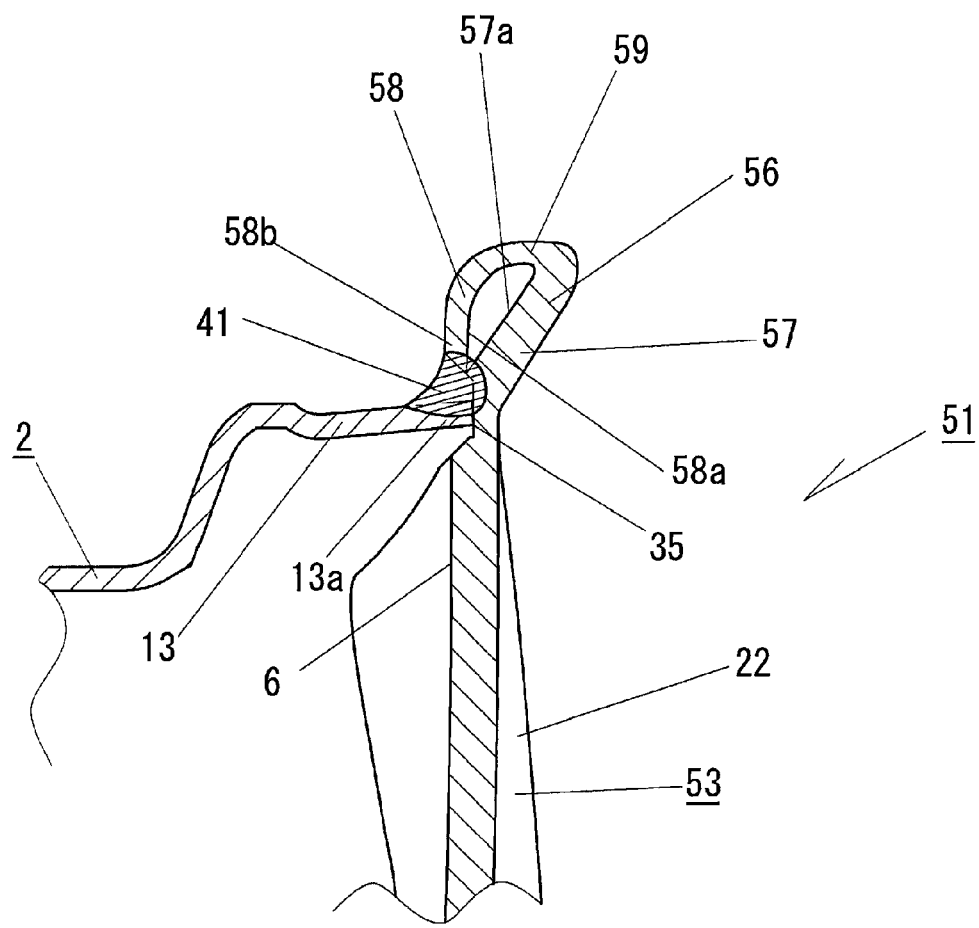
FIG. 4 is an enlarged vertical cross-sectional view of an automobile wheel 51 according to another example, showing a portion at which a wheel rim 2 and a wheel disc 53 are joined to each other.

In an automobile wheel 51 according to another example as shown in FIG. 4, a wheel disc 53 includes a front flange portion 56 provided at an outer peripheral edge portion and folded in a curved shape. The front flange portion 56 includes an annular front peripheral portion 57 provided on the design surface side, and an annular back peripheral portion 58 formed continuously from the annular front peripheral portion 57 and folded backward in a curved shape to extend radially inward. That is, a back surface 57a of the annular front peripheral portion 57 and a front surface 58a of the annular back peripheral portion 58 are not in surface contact with each other, and a hollow area is formed between the annular front peripheral portion 57 and the annular back peripheral portion 58.

Also, an inner peripheral end portion 58b of the annular back peripheral portion 58 of the front flange portion 56 of the wheel disc 53, the back surface portion 6 of the wheel disc 53, and the opening end portion 13a of the front bead seat portion 13 of the wheel rim 2 are welded to each other over the entire circumference of the wheel by the single continuous welded portion 41. Therefore, also according to the configuration above in which the front flange portion 56 is formed in a curved shape, it is possible to mitigate a stress concentration generated on a folded peripheral edge portion 59 of the front flange portion 56 by loads generated while the automobile is running. Thus, the configuration according to this example can also achieve the same effect as that achieved by the configuration according to the previous example discussed above.

The examples are similar except that the front flange portion 56 of the wheel disc 53 is folded in a curved shape with a hollow area formed. The same constituent components of the example are denoted by the same reference numerals, and are not described herein.

Figure 5:
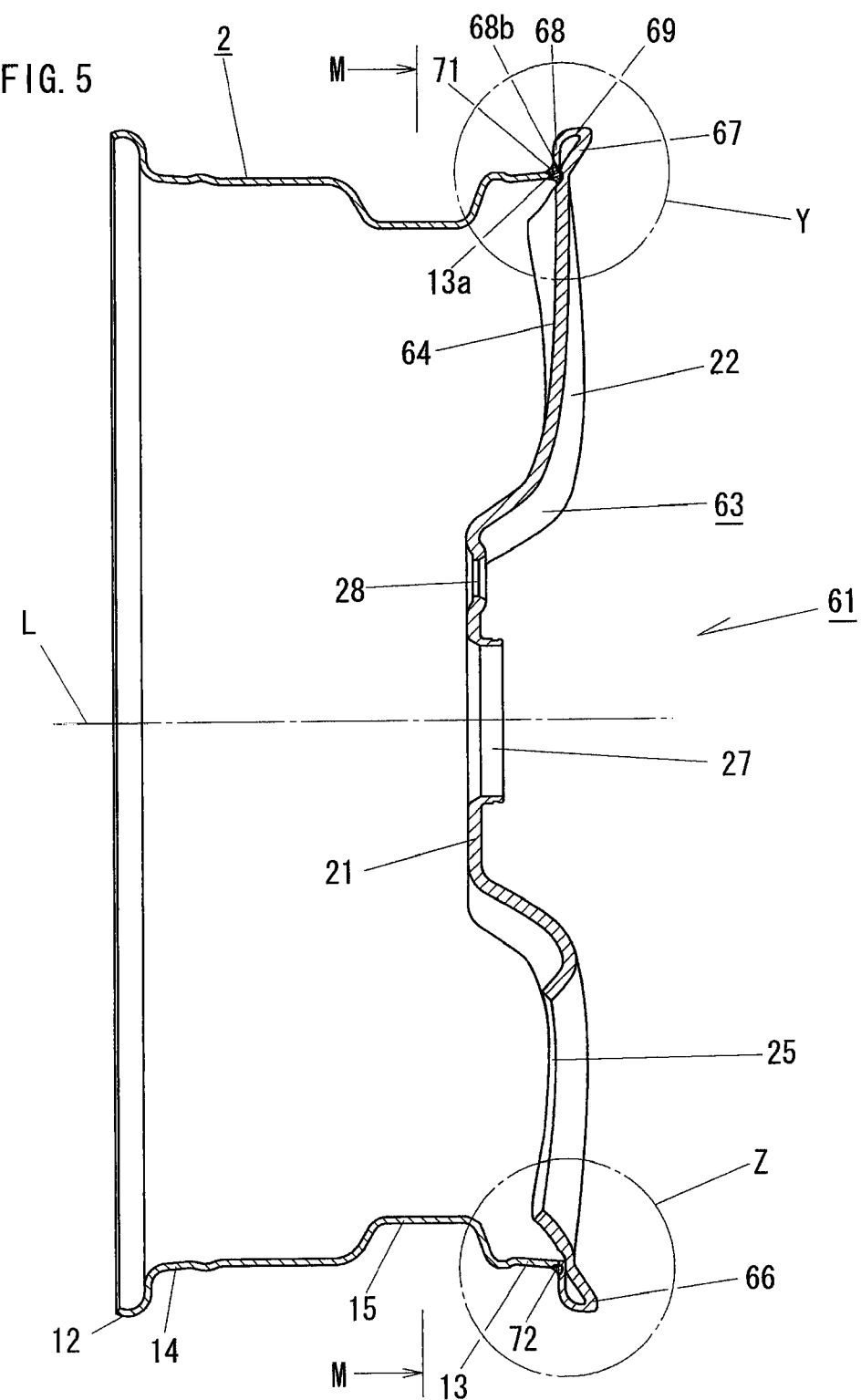
FIG. 5 is a vertical cross-sectional view of an automobile wheel 61 according to a further example.

In an automobile wheel 61 according to a further example, as shown in FIGS. 5 and 7, a wheel disc 63 includes a front flange portion 66 folded in a curved shape as in the example discussed above. The front flange portion 66 is formed with an inner peripheral end portion 68b of an annular back peripheral portion 68 contacting a back surface 67a of an annular front peripheral portion 67 (or a back surface portion 64 of the wheel disc 63) over the circumference, and a space is formed inside the front flange portion 66. Further, the inside diameter of the annular back peripheral portion 68 of the front flange portion 66 is set to be substantially the same as the inside diameter of the opening end portion 13a of the front bead seat portion 13 of the wheel rim 2. In the configuration according to this example, no annular joint groove is formed in the back surface portion 64 of the wheel disc 63.

Figure 6:
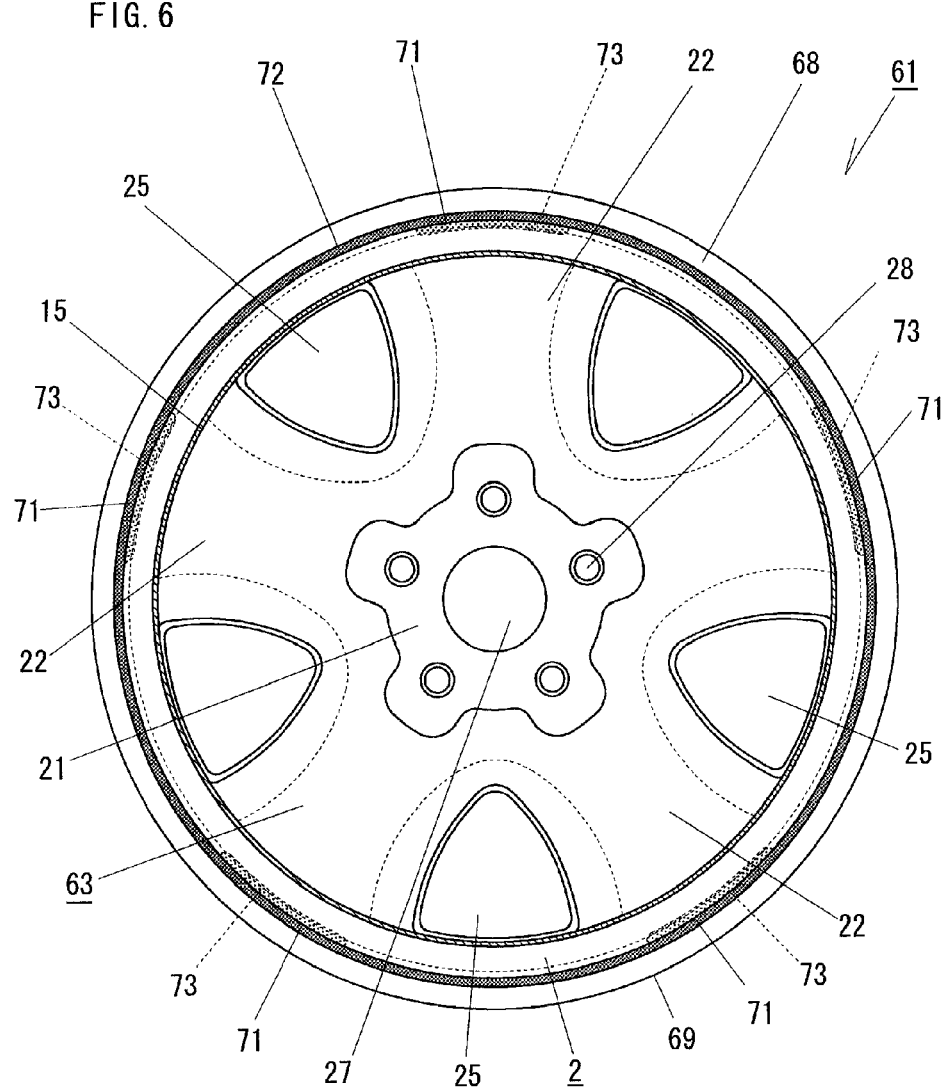
FIG. 6 is a cross-sectional view taken along the line M-M of FIG. 5.

The wheel disc 63 and the wheel rim 2 are positioned with their respective center axes L aligned with each other, and the opening end portion 13a of the front bead seat portion 13 of the wheel rim 2 is abutted against the back surface of the inner peripheral end portion 68b of the annular back peripheral portion 68 of the front flange portion 66 of the wheel disc 63. Then, the inner peripheral end portion 68b of the annular back peripheral portion 68 of the front flange portion 66 of the wheel disc 63 and the opening end portion 13a of the front bead seat portion 13 of the wheel rim 2 are arc-welded to each other over the entire circumference of the wheel from the outer side of the wheel rim 2 as shown in FIG. 6. A first welded portion 72 is thus formed. Further, the inner peripheral end portion 68b of the annular back peripheral portion 68 of the front flange portion 66 of the wheel disc 63 and the back surface portion 64 of the wheel disc 63 are arc-welded to each other at a plurality of points arranged at equal intervals along the circumference of the wheel from the inner side of the wheel rim 2. Second welded portions 73 are thus formed intermittently along the circumference of the wheel. In this example, the second welded portions 73 are formed at locations opposite the respective spoke portions 22 in the wheel circumferential direction. At the locations where the second welded portions 73 are formed, as shown in FIG. 7A, continuous welded portions 71 in which the second welded portions 73 and the first welded portion 72 are formed continuously with each other are formed. Meanwhile, at the locations where the second welded portions 73 are not formed, as shown in FIG. 7B, the wheel rim 2 and the wheel disc 63 are joined to each other only by the first welded portion 72. That is, in the automobile wheel 61 according to this example, the wheel disc 63 and the wheel rim 2 are joined to each other over the entire circumference of the wheel by the first welded portion 72, and joined to each other at equal intervals along the circumference of the wheel by the continuous welded portions 71.

Also in the configuration according to this example, the inner peripheral end portion 68b of the annular back peripheral portion 68 of the front flange portion 66 of the wheel disc 63, the opening end portion 13a of the front bead seat portion 13 of the wheel rim 2, and the back surface portion 64 of the wheel disc 63 are integrally joined to each other by the continuous welded portions 71 described above. Therefore, it is possible to mitigate a stress concentration generated on a folded peripheral edge portion 69 of the front flange portion 66 by loads generated while the automobile is running as in the examples discussed above. Further, with the continuous welded portions 71 formed intermittently along the circumference of the wheel, the strength and rigidity of the continuous welded portions 71 and the first welded portion 72 can be improved, mitigating a stress concentration due to the loads mentioned above. Thus, the configuration according to this example can also achieve the same effect as that achieved by the configuration according to the examples discussed above.

This example is substantially the same in configuration as the examples discussed above except that the front flange portion 66 of the wheel disc 63 is folded in a curved shape, and that the first welded portion 72 formed over the entire circumference from the outer side of the wheel rim 2 and the second welded portions 73 formed intermittently from the inner side of the wheel rim 2 are provided. The same constituent components are denoted by the same reference numerals, and are not described herein.

In an automobile wheel 81 according to the example, as shown in FIG. 8, the wheel disc 63 and the wheel rim 2 according to the example discussed above are joined to each other by the first welded portion 72 formed over the entire circumference of the wheel from the outer side of the wheel rim 2 and a second welded portion 83 formed over the entire circumference of the wheel from the inner side of the wheel rim 2. That is, this example is the same in configuration as the example discussed above except that the second welded portion 83 is formed over the entire circumference of the wheel. Therefore, constituent components of this example that are the same as those of the previous example are denoted by the same reference numerals, and are not described herein.

Figure 9:
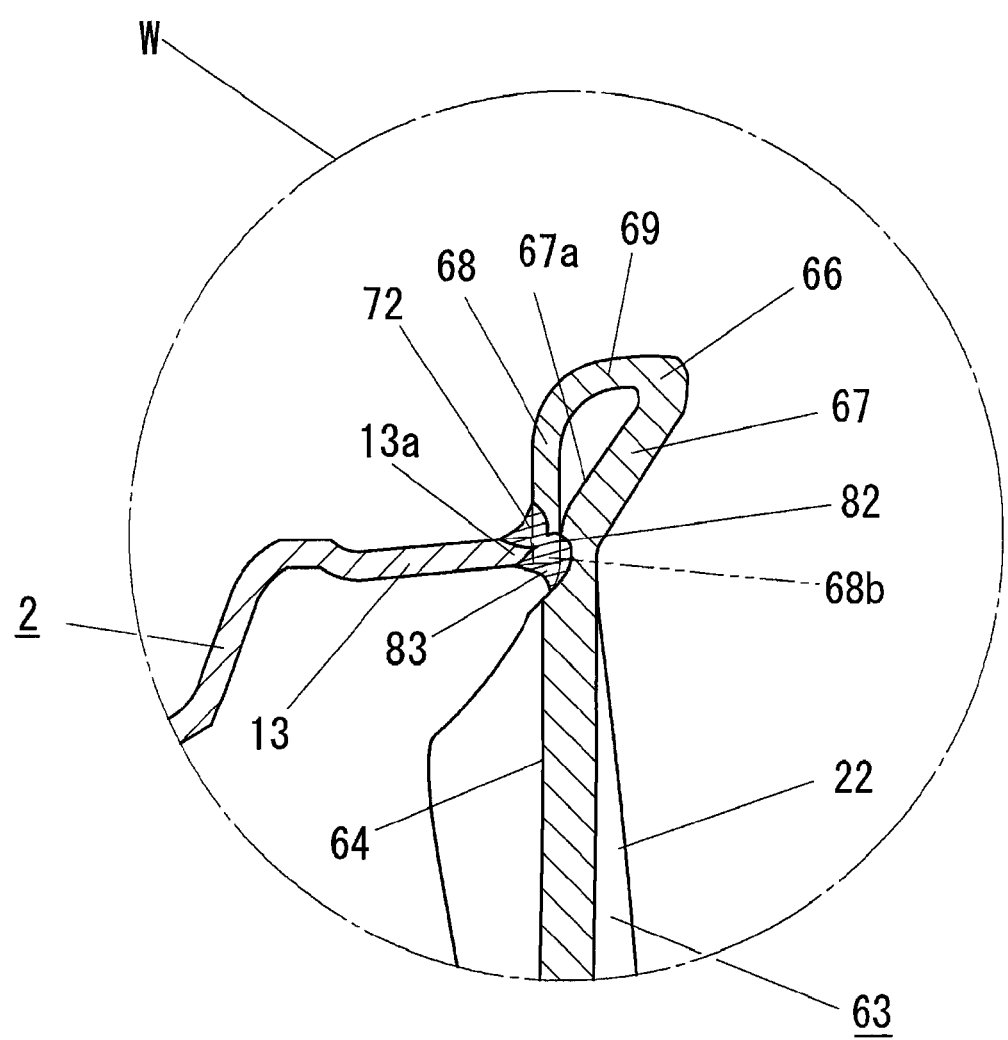
FIG. 9 is an enlarged view of the part W of FIG. 8A.

In the configuration according to the example as shown in FIG. 9, the wheel disc 63 and the wheel rim 2 are joined to each other by a continuous welded portion 82 in which the first welded portion 72 and the second welded portion 83 are formed continuously with each other. Also according to the automobile wheel 81 of this example, it is possible to mitigate a stress concentration generated on the folded peripheral edge portion 69 of the front flange portion 66 and the continuous welded portion 82 by loads generated while the automobile is running, achieving the same effect as that achieved by the configuration according to the example discussed above.

Figure 10:
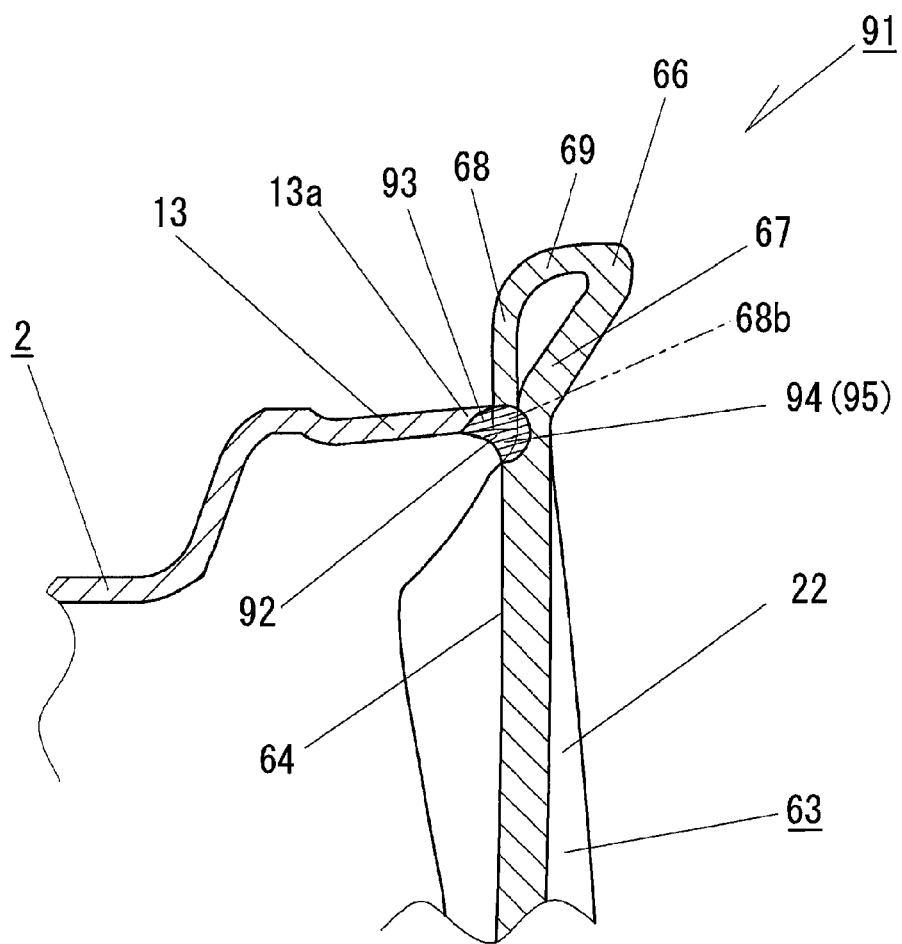
FIG. 10 is an enlarged vertical cross-sectional view of an automobile wheel 91 according to another example, showing a portion at which the wheel rim 2 and a wheel disc 63 are joined to each other.

In an automobile wheel 91 according to a further example as shown in FIG. 10, the wheel disc 63 and the wheel rim 2 according to the example discussed above are joined to each other by a single continuous welded portion 92 formed over the entire circumference of the wheel from the inner side of the wheel rim 2. That is, the inner peripheral end portion 68b of the annular back peripheral portion 68 of the front flange portion 66 of the wheel disc 63, the opening end portion 13a of the front bead seat portion 13 of the wheel rim 2, and the back surface portion 64 of the wheel disc 63 are integrally joined to each other by the single continuous welded portion 92.

The continuous welded portion 92 includes a first welded portion 93, according to aspects of the present invention, in which the inner peripheral end portion 68b of the annular back peripheral portion 68 of the front flange portion 66 of the wheel disc 63 and the opening end portion 13a of the front bead seat portion 13 of the wheel rim 2 are welded to each other as discussed above. Meanwhile, the continuous welded portion 92 includes a second welded portion 94, in which the inner peripheral end portion 68b of the annular back peripheral portion 68 of the front flange portion 66 of the wheel disc 63 and the back surface portion 64 of the wheel disc 63 are welded to each other. Alternatively, the continuous welded portion 92 includes a second welded portion 95, according to another aspect, in which the inner peripheral end portion 68b of the annular back peripheral portion 68 of the front flange portion 66 of the wheel disc 63 and the back surface portion 64 of the wheel disc 63 are welded to each other. Thus, it can be said that the continuous welded portion 92 is integrally formed with the first welded portion 93 and the second welded portion 94 (or the second welded portion 95) formed continuously with each other.

The automobile wheel 91 according to this example can also achieve the same effect as that achieved by the configuration according to the examples discussed above. This example is the same in configuration as the examples discussed above except that the single continuous welded portion 92 is formed from the inner side of the wheel rim 2. Thus, constituent components that are the same are denoted by the same reference numerals, and are not described herein.

Figure 11:
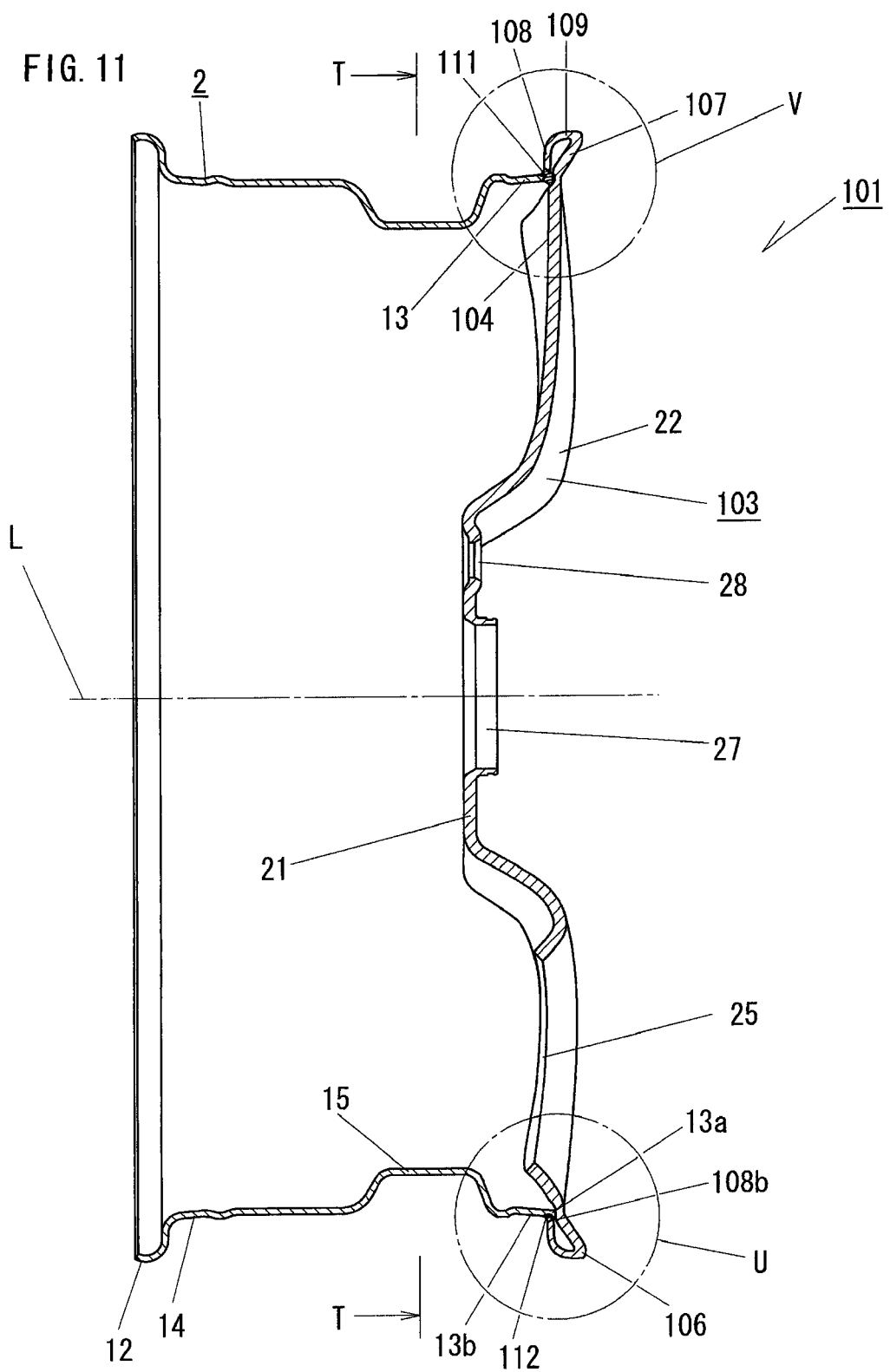
FIG. 11 is a vertical cross-sectional view of an automobile wheel 101 according to a further example.

In an automobile wheel 101 according to a yet further example as shown in FIGS. 11 and 13, a front flange portion 106 folded in a curved shape with a space formed inside is joined to an outer peripheral surface 13b of the opening end portion 13a of the front bead seat portion 13 of the wheel rim 2. The inside diameter of an annular back peripheral portion 108 of the front flange portion 106 is set to be substantially the same as the outside diameter of the opening end portion 13a of the front bead seat portion 13 of the wheel rim 2. The front flange portion 106 has a space between an annular front peripheral portion 107 and the annular back peripheral portion 108 as in the examples discussed above.

Figure 12:
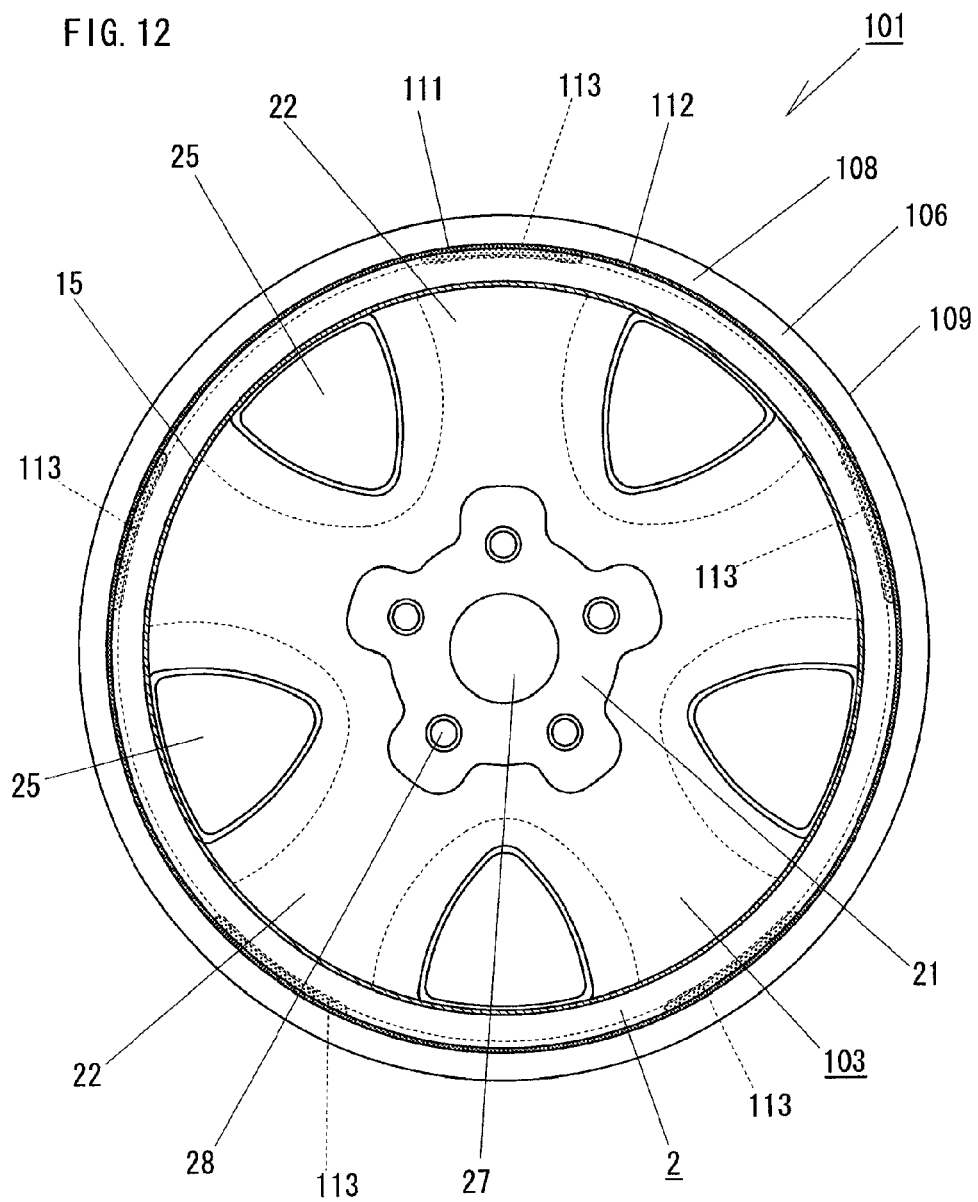
FIG. 12 is a cross-sectional view taken along the line T-T of FIG. 11.

The wheel rim 2 and the wheel disc 103 are joined to each other with the opening end portion 13a of the front bead seat portion 13 of the wheel rim 2 abutted against a back surface portion 104 of the wheel disc 103. Then, with the opening end portion 13a abutted against the back surface portion 104, an inner peripheral end portion 108b of the annular back peripheral portion 108 of the front flange portion 106 of the wheel disc 103 and the opening end portion 13a of the front bead seat portion 13 of the wheel rim 2 are arc-welded to each other over the entire circumference of the wheel from the outer side of the wheel rim 2 as shown in FIG. 12. A first welded portion 112 is thus formed. Further, the opening end portion 13a of the front bead seat portion 13 of the wheel rim 2 and the back surface portion 104 of the wheel disc 103 are arc-welded to each other at a plurality of points arranged at equal intervals along the circumference of the wheel from the inner side of the wheel rim 2. A plurality of second welded portions 113 are thus formed intermittently along the circumference of the wheel. Also, the second welded portions 113 are formed at locations opposite the respective spoke portions 22 in the wheel circumferential direction as in the third embodiment discussed above. At the locations where the second welded portions 113 are formed, as shown in FIG. 13A, continuous welded portions 111 in which the second welded portions 113 and the first welded portion 112 are formed continuously with each other are formed. That is, in the automobile wheel 101 according to this example, the wheel disc 103 and the wheel rim 2 are joined to each other over the entire circumference of the wheel by the first welded portion 112, and joined to each other at equal intervals along the circumference of the wheel by the continuous welded portions 111.

Also, the inner peripheral end portion 108b of the annular back peripheral portion 108 of the front flange portion 106 of the wheel disc 103, the opening end portion 13a of the front bead seat portion 13 of the wheel rim 2, and the back surface portion 104 of the wheel disc 103 are integrally joined to each other by the continuous welded portions 111 described above. Therefore, it is possible to mitigate a stress concentration generated on a folded peripheral edge portion 109 of the front flange portion 106 and the continuous welded portion 111 and the first welded portion 112 by loads generated while the automobile is running as in the examples discussed above. Thus, the configuration according to this example can also achieve the same effect as that achieved by the configuration according to the examples discussed above.

This example is substantially the same in configuration as the ones discussed above except that the front flange portion 106 of the wheel disc 103 is folded in a curved shape, and that the first welded portion 112 formed over the entire circumference from the outer side of the wheel rim 2 and the second welded portions 113 formed intermittently from the inner side of the wheel rim 2 are provided. The same constituent components between examples are denoted by the same reference numerals, and are not described herein.

In an automobile wheel 121 according to an example as shown in FIGS. 14A and 14B, the wheel disc 103 and the wheel rim 2 according to the example discussed above are joined to each other by the first welded portion 112 formed over the entire circumference of the wheel from the outer side of the wheel rim 2 and a second welded portion 123 formed over the entire circumference of the wheel from the inner side of the wheel rim 2. That is, this example is the same in configuration as the example discussed above except that the second welded portion 123 is formed over the entire circumference of the wheel. Therefore, constituent components of this example that are the same as those of the sixth embodiment are denoted by the same reference numerals, and are not described herein.

In the automobile wheel 121 according to this example, the first welded portion 112 and the second welded portion 123 are formed continuously with each other to form a continuous welded portion 122. The wheel disc 103 and the wheel rim 2 are joined by the continuous welded portion 122. The automobile wheel 121 according to this example can also achieve the same effect as that achieved by the configuration discussed above.

Figure 15:
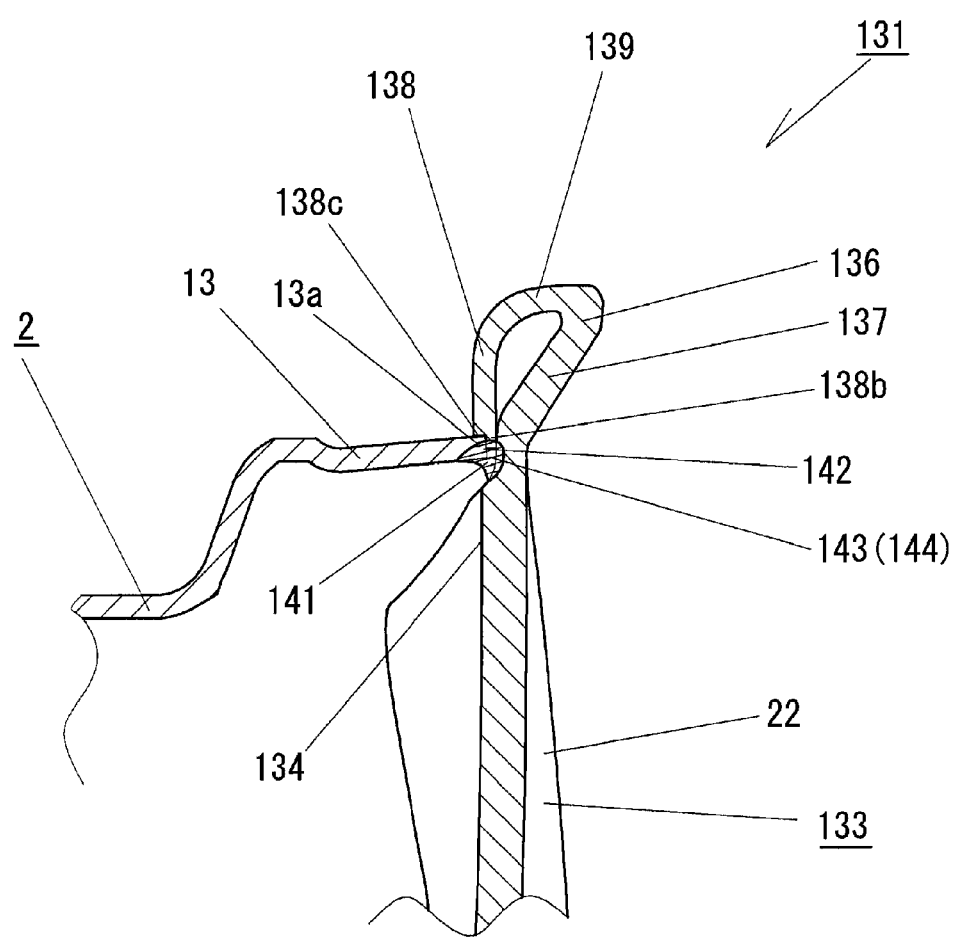
FIG. 15 is an enlarged vertical cross-sectional view of an automobile wheel 131 according to an example, showing a portion at which the wheel rim 2 and a wheel disc 133 are joined to each other.

In an automobile wheel 131 as shown in FIG. 15, a stepped fitting portion 138c, with which the opening end portion 13a of the front bead seat portion 13 of the wheel rim 2 is to be fitted, is formed circumferentially at an inner peripheral end portion 138b of an annular back peripheral portion 138 of a front flange portion 136 folded in a curved shape with a space formed inside. The front flange portion 136 is shaped in the same way as that in the examples discussed above. The inside diameter of the annular back peripheral portion 138 of the front flange portion 136 is set to be smaller than the outside diameter and larger than the inside diameter of the opening end portion 13a of the front bead seat portion 13 of the wheel rim 2. Therefore, when the opening end portion 13a of the front bead seat portion 13 of the wheel rim 2 is fitted with the stepped fitting portion 138c of the annular back peripheral portion 138 of the front flange portion 136, a gap is formed between the opening end portion 13a and a back surface portion 134 of a wheel disc 133.

With the opening end portion 13a of the front bead seat portion 13 of the wheel rim 2 fitted with the stepped fitting portion 138c of the annular back peripheral portion 138 of the front flange portion 136 as described above, the wheel rim 2 and the wheel disc 133 are arc-welded to each other over the entire circumference of the wheel from the inner side of the wheel rim 2. Accordingly, the opening end portion 13a of the front bead seat portion 13 of the wheel rim 2, the annular back peripheral portion 138 of the front flange portion 136 of the wheel disc 133, and the back surface portion 134 of the wheel disc 133 are integrally joined to each other to form a single continuous welded portion 141. In this example, the gap formed between the opening end portion 13a of the front bead seat portion 13 and the back surface portion 134 of the wheel disc 133 discussed above allows sufficient welding.

Also, the continuous welded portion 141 includes a first welded portion 142 according to the above aspects, and a second welded portion 143 according to an aspect or a second welded portion 144 according to another aspect as in the examples discussed above.

Also, it is possible to mitigate a stress concentration generated on a folded peripheral edge portion 139 of the front flange portion 136 and the continuous welded portion 141 by loads generated while the automobile is running, achieving the same effect as that achieved by the configuration discussed above. This example is the same in configuration as the examples discussed above except that the stepped fitting portion 138c is formed at the annular back peripheral portion 138 of the front flange portion 136. Thus, constituent components that are the same throughout the examples are denoted by the same reference numerals, and are not described herein.

In some of the configurations discussed above, the first welded portion and the second welded portion are formed to be continuous with each other in the continuous welded portion. In an alternative configuration, the first welded portion and the second welded portion may be formed not to be continuous with each other.

In other configurations discussed above, an annular joint groove in which the opening end portion of the front bead seat portion of the wheel rim is to be seated may be formed in the back surface portion of the wheel disc.

In the configuration according to the examples discussed above, the first welded portion 112, in which the inner peripheral end portion 108b of the annular back peripheral portion 108 of the front flange portion 106 of the wheel disc 103 and the opening end portion 13a of the front bead seat portion 13 of the wheel rim 2 are welded to each other, is formed over the entire circumference of the wheel, and the plurality of second welded portions 113, in which the opening end portion 13a of the front bead seat portion 13 of the wheel rim 2 and the back surface portion 104 of the wheel disc 103 are welded to each other, are formed at equal intervals along the circumference of the wheel. In an alternative configuration, a plurality of first welded portions, in which the inner peripheral end portion 108b of the annular back peripheral portion 108 of the front flange portion 106 of the wheel disc 103 and the opening end portion 13a of the front bead seat portion 13 of the wheel rim 2 are welded to each other, may be formed intermittently at equal intervals along the circumference of the wheel, and a second welded portion, in which the opening end portion 13a of the front bead seat portion 13 of the wheel rim 2 and the back surface portion 104 of the wheel disc 103 are welded to each other, may be formed over the entire circumference of the wheel.

In the configurations and alternative configurations discussed above, the front flange portion with a hollow area formed between the annular front peripheral portion and the annular back peripheral portion folded in a curved shape is provided at the outer peripheral edge portion of the wheel disc. However, the annular front peripheral portion and the annular back peripheral portion may contact each other.

The present invention is not limited to the embodiments discussed above, and may be modified appropriately within the scope and spirit of the present invention. For example, the present invention may be applied to automobile wheels with the same configuration that are formed from an aluminum alloy, a magnesium alloy, a titanium alloy, or a fiber-reinforced metal (FRM), achieving the same effect.

What is claimed is:

1. An automobile wheel comprising:
   a wheel rim comprising:
      a back flange portion formed at one opening edge portion; and
      a front bead seat portion is formed at the other opening edge portion; and
   a wheel disc in which a front flange portion is formed at an outer peripheral edge portion,
   wherein the front flange portion of the wheel disc comprises:
      an annular front peripheral portion provided on a design surface side; and
      an annular back peripheral portion folded backward from the annular front peripheral portion and formed continuously from the annular front peripheral portion to extend radially inward;
      a first welded portion in which an inner peripheral end portion of the annular back peripheral portion forming the front flange portion of the wheel disc and an opening end portion of the front bead seat portion of the wheel rim are welded to each other; and
   a second welded portion in which the inner peripheral end portion of the annular back peripheral portion of the front flange portion of the wheel disc and a back surface portion of the wheel disc are welded to each other, and
   wherein the first welded portion is formed over the entire circumference of the wheel, and the second welded portion is formed over at least the entire circumference of the wheel or intermittently at a plurality of points along the circumference of the wheel.

2. The automobile wheel according to claim 1,
   wherein the inner peripheral end portion of the annular back peripheral portion forming the front flange portion of the wheel disc, the opening end portion of the front bead seat portion of the wheel rim, and the back surface portion of the wheel disc are integrally joined to each other by a continuous welded portion in which the first welded portion and the second welded portion are formed continuously with each other.

3. The automobile wheel according to claim 2,
wherein an annular joint groove, in which the opening end portion of the front bead seat portion of the wheel rim is to be seated, is formed circumferentially in the back surface portion of the wheel disc, and
wherein the annular joint groove, the opening end portion of the front bead seat portion seated in the annular joint groove, and the inner peripheral end portion of the front flange portion are integrally joined to each other by the continuous welded portion in which the first welded portion and the second welded portion are formed continuously with each other.

4. The automobile wheel according to claim 1,
wherein the front flange portion of the wheel disc is formed such that a back surface of the annular front peripheral portion and a front surface of the annular back peripheral portion contact each other.

5. An automobile wheel comprising:
a wheel rim comprising:
a back flange portion formed at one opening edge portion; and
a front bead seat portion is formed at the other opening edge portion; and
a wheel disc in which a front flange portion is formed at an outer peripheral edge portion,
wherein the front flange portion of the wheel disc comprises:
an annular front peripheral portion provided on a design surface side; and
an annular back peripheral portion folded backward from the annular front peripheral portion and formed continuously from the annular front peripheral portion to extend radially inward;
a first welded portion in which an inner peripheral end portion of the annular back peripheral portion forming the front flange portion of the wheel disc and an opening end portion of the front bead seat portion of the wheel rim are welded to each other; and
a second welded portion in which the opening end portion of the front bead seat portion of the wheel rim and a back surface portion of the wheel disc are welded to each other,
wherein one of the first welded portion and the second welded portion is formed over the entire circumference of the wheel, and the other of the first welded portion and the second welded portion is formed over at least the entire circumference of the wheel or intermittently at a plurality of points along the circumference of the wheel, and
wherein the inner peripheral end portion of the annular back peripheral portion forming the front flange portion of the wheel disc, the opening end portion of the front bead seat portion of the wheel rim, and the back surface portion of the wheel disc are integrally joined to each other by a continuous welded portion in which the first welded portion and the second welded portion are formed continuously with each other.

6. The automobile wheel according to claim 5,
wherein an annular joint groove, in which the opening end portion of the front bead seat portion of the wheel rim is to be seated, is formed circumferentially in the back surface portion of the wheel disc, and
wherein the annular joint groove, the opening end portion of the front bead seat portion seated in the annular joint groove, and the inner peripheral end portion of the front flange portion are integrally joined to each other by the continuous welded portion in which the first welded portion and the second welded portion are formed continuously with each other.

7. An automobile wheel comprising:
a wheel rim comprising:
a back flange portion formed at one opening edge portion; and
a front bead seat portion is formed at the other opening edge portion; and
a wheel disc in which a front flange portion is formed at an outer peripheral edge portion,
wherein the front flange portion of the wheel disc comprises:
an annular front peripheral portion provided on a design surface side; and
an annular back peripheral portion folded backward from the annular front peripheral portion and formed continuously peripheral portion to extend radially inward;
a first welded portion in which an inner peripheral end portion of the annular back peripheral portion forming the front flange portion of the wheel disc and an opening end portion of the front bead seat portion of the wheel rim are welded to each other; and
a second welded portion in which the opening end portion of the front bead seat portion of the wheel rim and a back surface portion of the wheel disc are welded to each other,
wherein one of the first welded portion and the second welded portion is formed over the entire circumference of the wheel, and the other of the first welded portion and the second welded portion is formed over at least the entire circumference of the wheel or intermittently at a plurality of points along the circumference of the wheel, and
wherein the front flange portion of the wheel disc is formed such that a back surface of the annular front peripheral portion and a front surface of the annular back peripheral portion contact each other.

* * * * *